United States Patent [19]

Wagner et al.

[11] 4,389,544
[45] Jun. 21, 1983

[54] DIGITAL TELEPHONE APPARATUS

[75] Inventors: Theodore W. Wagner, West Palm Beach; Sam Liang, Deerfield Beach, both of Fla.; Deepak R. Muzumdar, Somerset, N.J.

[73] Assignees: Siemens Corporation, Iselin, N.J.; Siemens Corporation, Iselin, N.J.

[21] Appl. No.: 249,400

[22] Filed: Mar. 31, 1981

[51] Int. Cl.³ .................. H04M 11/06; H04J 3/06
[52] U.S. Cl. ........................ 179/2 DP; 179/99 M; 370/105
[58] Field of Search ............ 179/2 DP, 99 M, 99 R; 370/66, 67, 100, 105, 79

[56] References Cited

U.S. PATENT DOCUMENTS

| | | | |
|---|---|---|---|
| 4,203,011 | 5/1980 | Coviello | 179/99 M |
| 4,241,444 | 12/1980 | Kister | 370/100 X |
| 4,302,629 | 11/1981 | Foulkes et al. | 179/2 DP |
| 4,339,633 | 7/1982 | Ahmed | 179/99 M |

FOREIGN PATENT DOCUMENTS

| | | |
|---|---|---|
| 2619333 | 11/1977 | Fed. Rep. of Germany . |
| 2621603 | 11/1977 | Fed. Rep. of Germany . |
| 53-119606 | 10/1978 | Japan ............... 179/99 M |

OTHER PUBLICATIONS

"Fernsprechendgerate in digitaler Technik" *NTZ*, vol. 33 (1980), No. 12.
*Ericsson Review*, vol. 58, No. 3, 1981, pp. 134–141; "PCM Signaling Equipment in the BYB Construction Practice" by Lars-Erik Lorsson.

*Primary Examiner*—A. D. Pellinen
*Assistant Examiner*—Keith E. George
*Attorney, Agent, or Firm*—Karl F. Milde, Jr.; Karl F. Milde, Jr.

[57] ABSTRACT

Digital telephone apparatus suitable for use as a subscriber station as well as for an attendant console. The telephone apparatus is connectable for full duplex communication with a four wire telephone transmission line. The telephone apparatus is capable of transmitting PCM speech data and/or digital data from a digital data interface to a peripheral data system. The telephone apparatus comprises an internal data bus to which are connected a digital transceiver, a sync/signalling generator, a serial frame synchronizer and at least one codec/PCM filter. The transceiver transmits and receives digital data to and from the telephone transmission line. The sync/signalling generator repeatedly supplies an 8 bit first data word to the internal data bus containing a binary synchronizing code and a signalling code. Simultaneously, the serial frame synchronizer repeatedly receives from the data bus and decodes an 8 bit first data word containing a synchronizing code and a signalling code. The codec/PCM filter repeatedly receives from and transmits to said internal data bus 8 bit PCM voice samples as additional data words immediately following the first data word. A microcomputer, including a number of input/output devices, receives successive signalling codes from the serial frame synchronizer and repeatedly transmits signalling codes to the sync/signalling generator for communicating with the telephone exchange to which the apparatus is connected.

39 Claims, 18 Drawing Figures

| 6A |
|---|
| 6B |

| FIG. 12A | FIG. 12B |

DIGITAL TELEPHONE APPARATUS

CROSS-REFERENCE TO RELATED APPLICATIONS

This application is related to the following commonly-owned U.S. Patent Applications:

(1) U.S. Patent Application Ser. No. 249,377 of Donald Gray and Theodore Wagner for "A Transceiver Unit for Use with a Telecommunication System";

(2) U.S. Patent Application Ser. No. 249,399 of Theodore Wagner, Ramesh M. Vyas and Sam Liang for "Synchronizing Circuit for Use with a Telecommunication System";

(3) U.S. Patent Application Ser. No. 249,395 of Deepak R. Muzumdar, George Mierzwa, Richard Sanders and Orrie J. Vander Meiden for "Frame Format for PCM Speech Data In a Telephone Transmission System & Digital Telephone Apparatus for Use with this Frame Format"; and (4) U.S. Patent Application Ser. No. 249,390 of Mustafa Y. M. Saleh for "DC/DC Converter".

BACKGROUND OF THE INVENTION

The present invention relates to a telephone apparatus suitable for use as a subscriber station and/or an attendant console. More particularly, the invention relates to a digital telephone apparatus which is adapted for connection with a telephone transmission line for full duplex communication between the apparatus and all other units which are connected with the telephone system, such as other subscriber stations, attendant consoles and data recording, storage and processing equipment.

A preferred embodiment of the present invention concerns telephone keyset apparatus; that is, a telephone apparatus having a number of dial, line and function keys. This apparatus may contain one or more of a number of telephone "features" and "functions" as will be described below.

As is well known, the standard telephone apparatus comprises an acoustic/electrical transducer or microphone, an electrical/acoustic transducer or earphone, a hook switch, a dialing mechanism and a bell or buzzer. The structure required to include these features need be no larger than a telephone handset. In fact, telephone instruments are known in which the handset itself has a hook switch which is actuated when the handset is in the rest or "on-hook" position, and deactivated when the handset is lifted off a flat surface into the "off-hook" position for use in communicating.

As the cost of electronic equipment is currently falling, many hardware "features" have been and are being added to this otherwise remarkable invention. Some typical features which a telephone instrument may include are:

(1) a plurality of "line" keys which, when depressed, connect the telephone to different lines;
(2) a plurality of "function" keys which, when depressed, initiate one or more of a number of telephone functions;
(3) a display which images a number of alphanumeric characters;
(4) a microphone for "hands free" speaking;
(5) a speaker for "hands free" listening;
(6) an external unit jack for connecting the telephone to a recording printer, a digital data interface unit, a magnetic recorder for taking messages, a console containing additional line and function keys and/or another peripheral unit such as an external computer, CRT display and the like; and
(7) a small computer which may be utilized by the customer as a programmable element as well as to control the instrument.

Experience has shown that more and more "functions" or modes of operation have been, and will be added to the telephone instrument to make it a most convenient and versatile piece of equipment. Not only will the telephone in the future serve each user as an instrument of voice and data communications, it will also serve other telecommunication functions such as providing music, external paging, message recording and/or dictation access; room and building security against unauthorized access and/or fire; and room and building energy control such as lighting, heat and air conditioning. As mentioned above, the telephone instrument may also serve as a small, handy computer which can operate off-line or in direct communication with another computer at another location.

When designing telephone keyset apparatus—that is, a telephone instrument with a number of keys for dialing and for other functional purposes—it is desirable to take into consideration and to provide for the possibility of implementing the various features and functions such as those enumerated above. More particularly, it is desirable to develop an economical and efficient telephone instrument which is not significantly larger than presently existing telephones and which may be implemented inexpensively as a "modular" device that can readily be tailored to meet the needs of each user. Such a modular structure would facilitate the creation of a "family" of telephones, telephone consoles and other ancillary equipment, from option-laden instruments having all the available features and functions to a basic telephone instrument constructed at minimum cost.

One of the important requisites for a telephone apparatus of the type described above is the ability to connect to a standard, four-wire telephone transmission line and to operate with full duplex communication. Another important requisite is that the apparatus transmit and receive information in digital, not analog, form. Digital telephone systems known in the art utilize two different types of solutions to provide duplex communication with sufficient transmission quality. The first technique requires a plurality of transmission lines: that is, separate lines for PCM voice data in each direction, for signalling and for synchronizing. At least two of these wires are also used to provide DC power to the telephone apparatus. The second technique provides a so-called "ping-pong" type of duplex data transmission. With this technique, the transmission of data in opposite directions is alternately generated in the subscriber station/attendant console, on one hand, and in the telephone system or exchange, on the other. This data is transmitted in separate time periods via a two or four-wire transmission line.

Thus, whereas the first technique provides full duplex transmission by utilizing a multiplicity of wires, the second technique uses only a two or four-wire transmission line but sends data alternately back and forth between the telephone exchange and the subscriber station or attendant console.

SUMMARY OF THE INVENTION

It is accordingly an object of the present invention to provide a telephone apparatus which may be implemented with numerous optional features and functions or implemented, as desired, without these features and functions at a cost which is not significantly greater than the present cost of telephone apparatus.

It is a further object of the present invention to provide a telephone apparatus, suitable for use as a subscriber station or attendant console, which is capable of full duplex, digital communication with a standard four-wire telephone transmission line.

It is a further object of the present invention to provide a telephone apparatus which is capable of transmitting PCM encoded voice data on one, but preferably more than one channel simultaneously and/or transmit other digital data in the full duplex mode.

It is a still further object of the present invention to provide a telephone apparatus in which DC power to the apparatus is "phantomed" over the transmission lines, so as not to increase the number of lines required for operation of the apparatus.

These objects, as well as other objects which will become apparent in the discussion that follows are achieved, according to the present invention, by providing an internal data bus to which is connected a digital transceiver, a sync/signalling generator, a serial frame synchronizer and at least one codec/PCM filter. The digital transceiver is operative to receiver and transmit digital speech data, signalling data, synchronizing and other information via the transmission line which correspond to digital data transmitted and received, respectively, on the internal data bus. The sync/signalling generator is operative to repeatedly generate and pass to the data bus a first data word containing a binary synchronizing code and a signalling code. The serial frame synchronizer is operative to repeatedly receive from the data bus and decode a first data word containing a synchronizing code and a signalling code. The codec/PCM filter is operative to convert a second data word appearing on the data bus into an analog voice signal and to convert an analog voice signal into a second data word for transmission on the data bus.

According to the invention, the digital telephone apparatus just described also includes a microcomputer connected to the sync/signalling generator and to the serial frame synchronizer for repeatedly transmitting binary signalling information to the sync/signalling generator for formation of the first data word to be transmitted, and for repeatedly receiving binary signalling information from the serial frame synchronizer that has been decoded from a received first data word. Finally, input/output devices are provided and connected to the microcomputer for entering input information into, and indicating output information received from the microcomputer. The microcomputer is thus operative to translate between the signalling information and the input and output information.

The above described arrangement of the telephone apparatus permits full duplex, digital communication over the conventional four wires of a telephone transmission line. This apparatus makes it possible to transmit and receive synchronized PCM voice data as well as other digital data in a simple and effective manner.

According to a particular feature of the invention, the telephone apparatus comprises two codec/PCM filters; namely, a primary codec/PCM filter connected with the internal data bus and with a microphone and receiver of a telephone handset, and a secondary codec/PCM filter also connected with the internal data bus and with other microphone and/or receiver components of the telephone instrument.

In this way, it is possible to provide at least one more channel for the transmission of a further PCM voice sample in the prescribed frame format. The apparatus therefore permits the transmission and reception of at least two completely independent PCM encoded voice signals.

According to a further development of the invention, the internal data bus of the digital telephone apparatus may be optionally connected with a peripheral data system through a digital data interface. This permits the subscriber who is using the telephone apparatus to transmit and receive other types of data, for example from an outside computer system, simultaneously and in addition to the PCM voice data.

According to a still further development of the present invention, the telephone transmission line includes two pairs of two wires which are connected with primary windings of two transformers. The secondary windings of the transformers are connected to the digital transceiver. In this way, DC power may be "phantomed" to the telephone apparatus and removed at the two primary windings to supply a DC input voltage to a DC/DC power converter.

The digital transceiver according to the invention therefor has two receiving inputs which are connected with the secondary winding of one transformer and two transmitting outputs which are connected with the secondary winding of the other transformer.

According to a further development of the invention, the digital transceiver includes a transmitter which generates AMI (alternate mark inverted) output pulses from the "data in" pulses and lock pulses received from the internal data bus. The transceiver also includes a receiver which recovers clock pulses from the transmitted AMI signal and recovers data pulses in the proper time slot and with the proper pulse width for transmission to the internal data bus.

In this way, the transmission of synchronizing bits, signalling bits, speech and other binary data is organized in a special frame format which simplifies the synchronization and handling of useful data.

According to a further development, the serial frame synchronizer identifies a synchronizing code in a combination of synchronizing and signalling bits contained in one of a plurality of 8 bit words (bytes) in a frame. In particular, each frame contains a first data word comprising synchronizing and signalling information and at least one additional data word which carries PCM voice data.

According to a particular preferred embodiment of the invention, the synchronizing code is 7 bits in length. The remaining bit in the first data word includes, in successive frames, a start bit, signalling bits and stop bits. The entire sequence of successive frame which transmit 8 bits of signalling information is defined as a "superframe" which is preferably 32 frames long.

This frame format, and in particular the use of a 7 bit synchronizing code increases the reliability of the apparatus. To further guard against problems arising from errors in transmission, each byte of signalling information is transmitted three times, and majority voting is used to select the correct bits.

According to a further development of the invention, the telephone apparatus comprises at least one hands free unit connected with one of the codec/PCM filters. This hands free unit comprises the usual microphone and loudspeaker and operates to prevent feedback from the loudspeaker to the microphone.

According to a further development of the invention, the input/output devices connected to the microcomputer include dial keys, line and function keys, an alphanumeric display, a subscriber message detailed recording printer and a telephone hook switch. These input/output devices of the computer are to be distinguished from the other peripheral devices of the telephone apparatus in that they are controlled and operated at a much slower data rate than the other peripheral devices.

According to a still further development of the invention, a voice grade analog circuit is connected to the codec/PCM filters to interface with the analog components of the telephone apparatus. The voice grade analog circuit is controlled by the microcomputer to select one or both of the codec/PCM filters for transmission of PCM voice data. This arrangement makes it possible not only to simultaneously transmit data from a digital data interface on one channel while transmitting voice on another, but also makes it possible to establish a "call-back connection" independently of the configuration of the telephone system.

It will be understood that the number of data words in a frame determines the number of peripheral units which may be supported simultaneously from the telephone apparatus according to the invention. While the preferred embodiment of the invention provides for two independent channels at the standard 64 Kilobit/sec. rate used in PCM transmission, additional channels may be added utilizing the same principles of operation described herein. With additional channels, it would be possible to add further features by connecting additional voice grade analog circuits, data systems, video systems and/or data printers, etc.

For a full understanding of the present invention, reference should now be made to the following detailed description of one preferred embodiment of the invention and to the accompanying drawings.

DETAILED DESCRIPTION OF A PREFERRED EMBODIMENT

The invention will now be described with reference to a preferred embodiment of a telephone apparatus suitable for subscriber stations and attendant consoles equipped either with or without one or more optional features such as a speakerphone ("hands free") unit, a digital data interface, a subscriber message detailed recording printer and the like. This digital telephone apparatus is connected for duplex communications with a telephone transmission line that forms a part of a digital telephone system. Such a system may comprise a private branch exchange (PABX) or may constitute a public telephone system.

Figures 1, 1A:
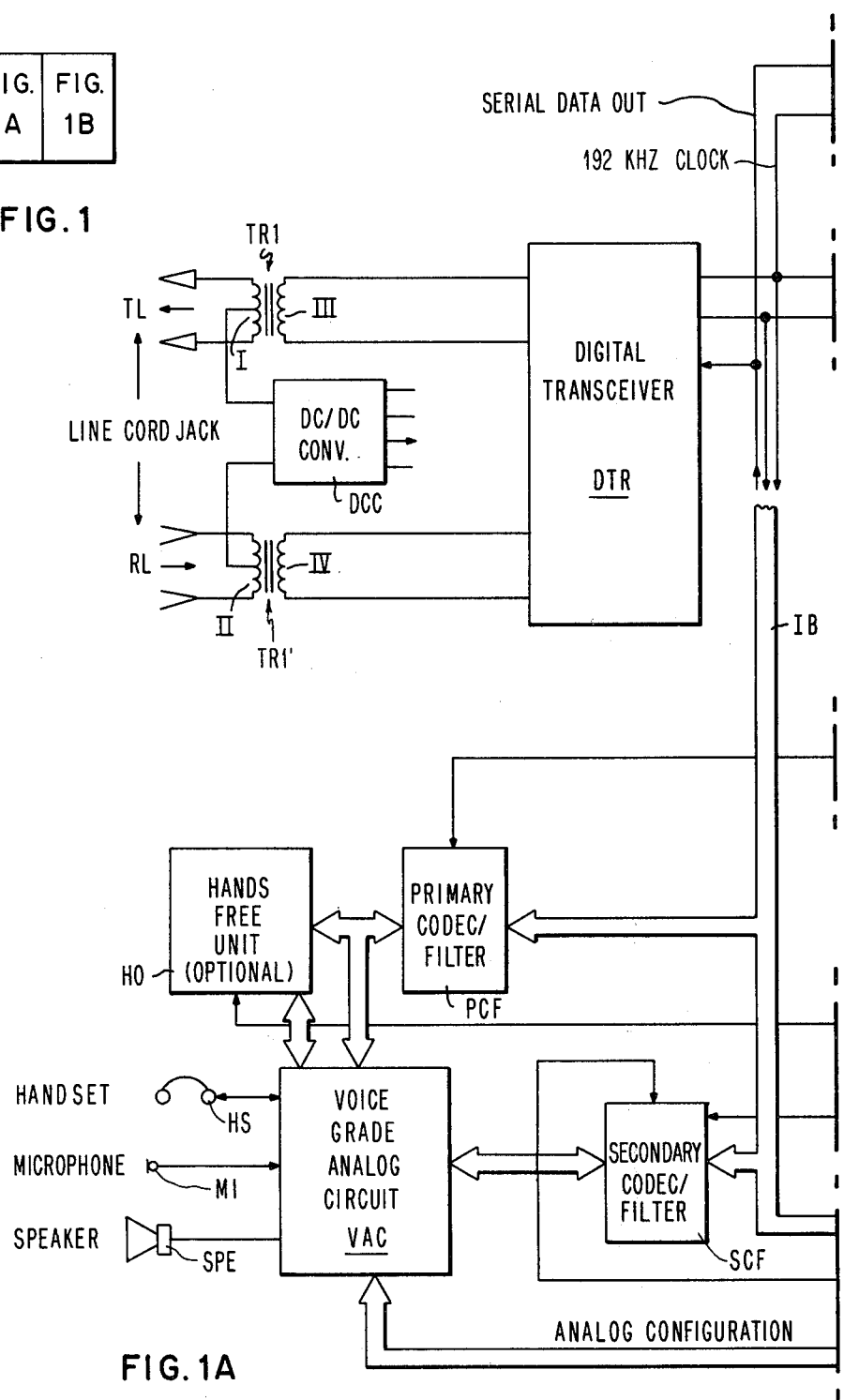
FIG. 1 is a block diagram of a digital telephone apparatus according to the invention and suitable for subscriber stations and attendant consoles.
Figure 1B:
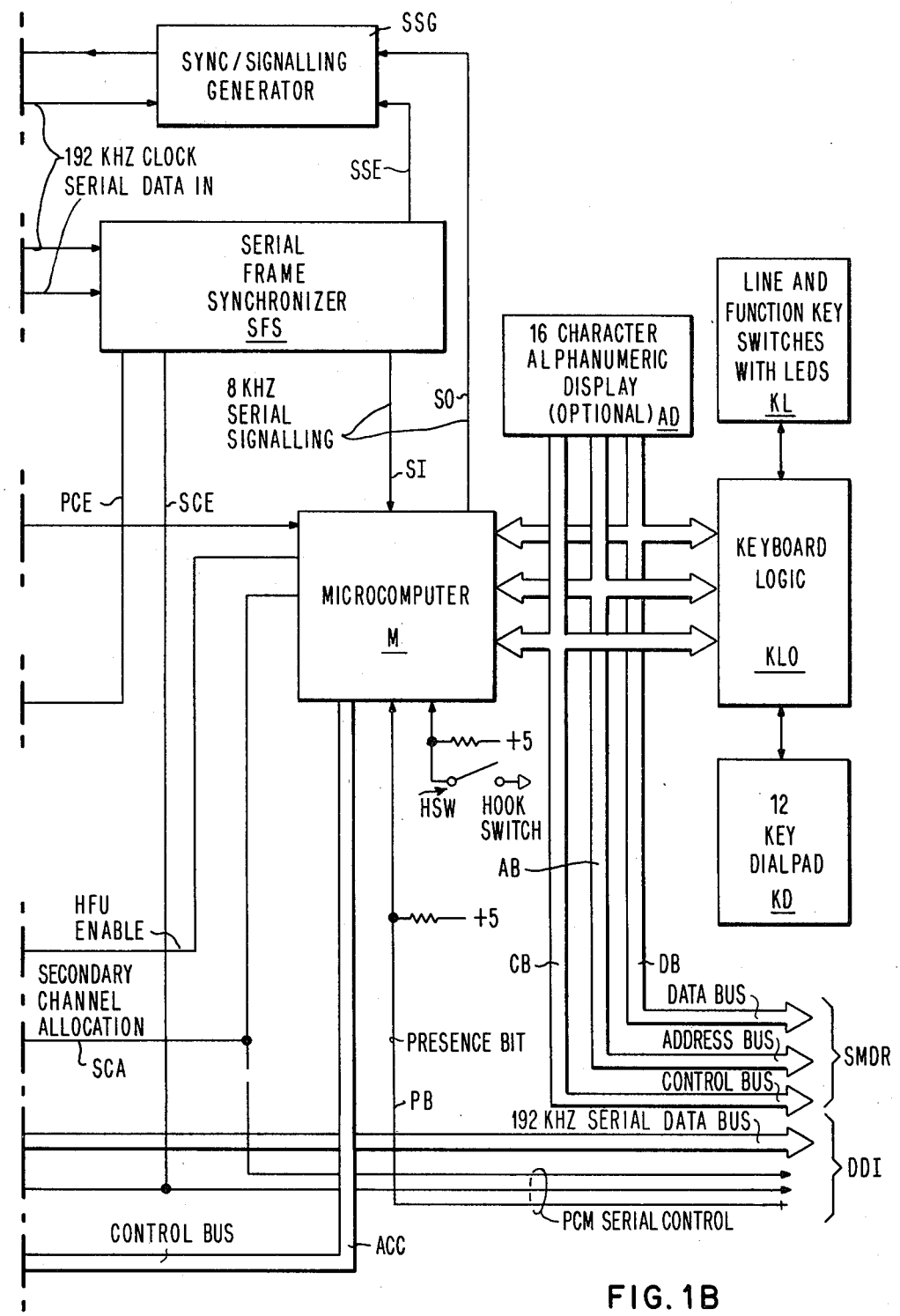

Apparatus Architecture (FIG. 1)

FIG. 1 shows a digital telephone apparatus suitable for subscriber stations and attendant consoles. This apparatus may be connected to peripheral, optional equipment (not shown) such as a digital data interface DDI or a subscriber message detailed recording printer SMDR. The digital telephone apparatus is connected for duplex communications with a telephone transmission line TL/RL. The transmission line TL/RL is connected with windings I and II of transformers TR1 and TR1'. These transformers provide a phantom pair of wires, which is connected with a DC/DC power supply converter DCC. This converter receives direct current from the transmission line and generates the different DC voltages needed for the apparatus.

Secondary windings III and IV of transformers TR1 and TR1' are connected with a digital transmitter/receiver or "transceiver" DTR. The two wires of pair TL of the transmission line are the transmitting wires; the two wires of pair RL of the transmission line are the receiving wires. The transceiver DTR simultaneously transmits on the line TL and receives from the line RL a plurality of different data words which are arranged in a prescribed three-word frame format, described herein below, and encoded with alternate mark inversion.

The transceiver DTR converts the alternate mark inversion encoded signal received from the transmission line RL into a 192 KHz clock as well as a serial data stream, herein called "serial data in". The transceiver also converts a data stream called "serial data out" from the telephone apparatus into an alternate mark inverted encoded signal for transmission on the line TL.

The 192 KHz clock signal is passed via an internal, serial data bus IB to a sync/signal generator SSG, a serial frame synchronizer SFS, a primary codec/PCM filter PCF, a secondary codec/PCM filter SCF and at least one peripheral system, for example, the digital data interface DDI of a digital computer or the like. Serial data received from the transmission line RL is passed via the internal data bus IB to the serial frame synchronizer SFS, the primary codec/PCM filter PCF, the secondary codec/PCM filter SCF and the peripheral system DDI. The digital transceiver DTR receives a serial data stream, for transmission onto the transmission line TL, via the internal data bus IB from the sync/signal generator SSG, the primary codec/PCM filter PCF, the secondary codec/PCM filter SCF and the peripheral system DDI.

The serial frame synchronizer SFS detects from the received serial data the synchronizing code and the signalling bit or bits, which are transmitted in one word of the frame format, so as to synchronize the different time slots of a frame format in time. The serial frame synchronizer generates three enabling signals in synchronism with the three eight-bit words or bytes of each frame format: sync/signalling enable SSE, primary channel enable PCE, and secondary channel enable SCE. The signal SSE is passed to the sync/signalling generator SSG which generates a word (byte) comprising a seven bit synchronization code and a single signalling bit received from the microcomputer M via the signalling output line SO. Upon receipt of the signal SSE, the sync, signalling generator passes this word out on the serial data out line of the internal bus to the digital transceiver DTR.

The signal PCE is passed to the microcomputer M and to the primary codec/PCM filter PCF. The rising edge of the signal PCE informs the microcomputer to look for a signalling bit on the signalling input line SI. The signal PCE also enables the primary codec/PCM filter PCF to receive and transmit on the serial data in and serial data out lines, respectively.

The signal SCE enables the secondary codec/PCM filter SCF and/or the digital data interface DDI for transmission of serial data to and from these units. Selection of one of these units is made by the microcomputer M via a secondary channel allocation signal SCA. The digital data interface requests access to the secondary channel via a presence bit PB.

Both the microphone and the receiver of the handset as well as the microphone and the loudspeaker of the speakerphone or "hands free unit" are connectable by means of microcomputer-controlled switches with either one (but only one) of the two codec/PCM filters PCF and SCF. These switches belong to the voice grade analog circuit VAC which is controlled by the microcomputer M via an analog configuration control bus ACC. Normally there is no hands free feature in the telephone apparatus because the optional hands free circuit board HO is needed. If added, this hands free circuit board HO is enabled by a signal "HFU enable" from the microcomputer and will only be used in connection with one of the two codec/PCM filters. The hands free circuit selects for transmission the voice of the loudest speaker. It may be a conventional unit and will not be described herein because it forms no part of the present invention.

If one of the codec/PCM filters is connected with the telephone handset for transmitting and receiving of one word of the frame format, thus transmitting and receiving on one channel, a peripheral system, for example the digital data interface DDI, may be enabled to transmit on the other channel. As will be pointed out below, the three-word, two-channel frame format permits the multiplexing of both voice and data, or voice and voice.

In addition to these connections the telephone apparatus may hold a connection with an external subscriber via one codec/PCM filter and, in response to a signal from the subscriber, can make a call back connection via the second codec/PCM filter; that is, via a separate data word or channel of the frame format. In this case the first connection will be disconnected by the voice grade analog circuit VAC and the second connection will be established via the second codec/PCM filter and the voice grade analog circuit.

Thus the two channel frame format permits the telephone apparatus to support two different telecommunication connections simultaneously. For example, one connection may be made with another telephone subscriber for a voice communications while another connection is made with a data system for the transmission of digital data. Alternatively, the telephone apparatus may support a first subscriber to subscriber connection for normal voice communication plus a second subscriber to subscriber connection in a call back function.

As noted above, the microcomputer M controls the switching of the voice grade analog circuit VAC and the hands free circuit HO via the analog configuration control bus ACC and the control line "HFU enable", respectively. Furthermore, the microcomputer M controls the use of the second channel in the PCM frame via the secondary channel allocation line SCA. In this way, a peripheral data system connected to the digital data interface DDI may transmit and receive data via the telephone transmission line TL/RL.

However, the microcomputer has other functions as well. All the data which are transmitted and received over the internal data bus IB are fast data signals: In this embodiment, one word or byte per channel is transmitted every 125 microseconds. As will be explained below, the frame format also supports the transmission of slower data which are needed to perform such functions as setting characters in a numeric display, illuminating LEDs, transmitting operational commands and the like. This slower data is transmitted at a rate of 1 bit per 125 microsecond frame or 8 KHz. This bit, the so-called "signalling" bit, is serially received by the microcomputer M and successive bits are assembled into bytes. For reasons which will be explained below, one byte is assembled every 4 milliseconds for a byte rate of 250 Hz.

Simultaneously with the receipt of signalling bits the microcomputer M transmits signalling bits at the same 8 KHz rate on the output line SO. This enables the microcomputer to conduct a signalling dialog with a private branch exchange (PABX) or some other switch at the end of the telephone transmission line TL/RL.

In addition to the signalling input and output on lines SI and SO, respectively, the microcomputer is coupled to I/O devices such as an alphanumeric display AD, a special message detailed recording printer SMDR and two keyboards KL and KD. The keyboards KL and KD are interfaced to the microcomputer via a keyboard logic KLO. The display, keyboards and printer are connected to the microcomputer via a common data bus DB, address bus AB and control bus CB. These I/O devices are thus addressed and controlled by the microcomputer M and transmit or receive data to and from the microcomputer in the conventional manner. Additional I/O devices may also be connected to the microcomputer via the data, address and control busses.

The alphanumeric display AD may be a 16 character liquid crystal display for informing the operator of the telephone apparatus of telephone numbers, names and other messages. The keyboard KL may comprise line keys for selecting and indicating one of a number of telephone lines to which the telephone apparatus is connected and function keys for selecting and indicating functions such as "HOLD", and "I-USE". The I-USE function is described in the commonly owned U.S. patent application Ser. No. 196,685 filed Oct. 14, 1980 by John Holesha entitled "I-USE Indication in a Telephone Keyset", now abandoned.

The key dialpad KD may or may not be provided with LEDs on each key and is intended for use in dialing telephone numbers. It may also be used to input numerical information to the microcomputer if the latter is programmed for use as a calculator, for example.

In addition to the I/O devices referred to above, the microcomputer M is also connected to the telephone hook switch HSW and is thus informed whether the telephone apparatus is in the "on-hook" or "off-hook" condition.

The microcomputer M may be any commercially available single chip computer which is sufficiently fast and has sufficient ROM and RAM capacity to accomplish the necessary tasks. A suitable microcomputer for this purpose is the Intel 8049.

The software or firmware for the microcomputer M will depend upon the functions the microcomputer is intended to execute. Typical commands for the microcomputer which may be received from a private branch exchange (PABX) via signalling bits on the line SI and assembled into 8-bit signalling bytes are:

1. Ring (or beep) the telephone apparatus;
2. Select type of ring;
3. Flash an LED;
4. Select the LED (to be flashed);
5. Turn on an LED;
6. Select the LED (to be turned on);
7. Turn-off an LED;
8. Select the LED (to be turned off).

Each of the above commands are defined by one byte. Note that two successive bytes are used for a complete instruction.

Typical signalling bytes which are sent from the microcomputer to the telephone system define on-hook and off-hook conditions and indicate the selection of line, function and dial keys by the operator.

Figure 2:
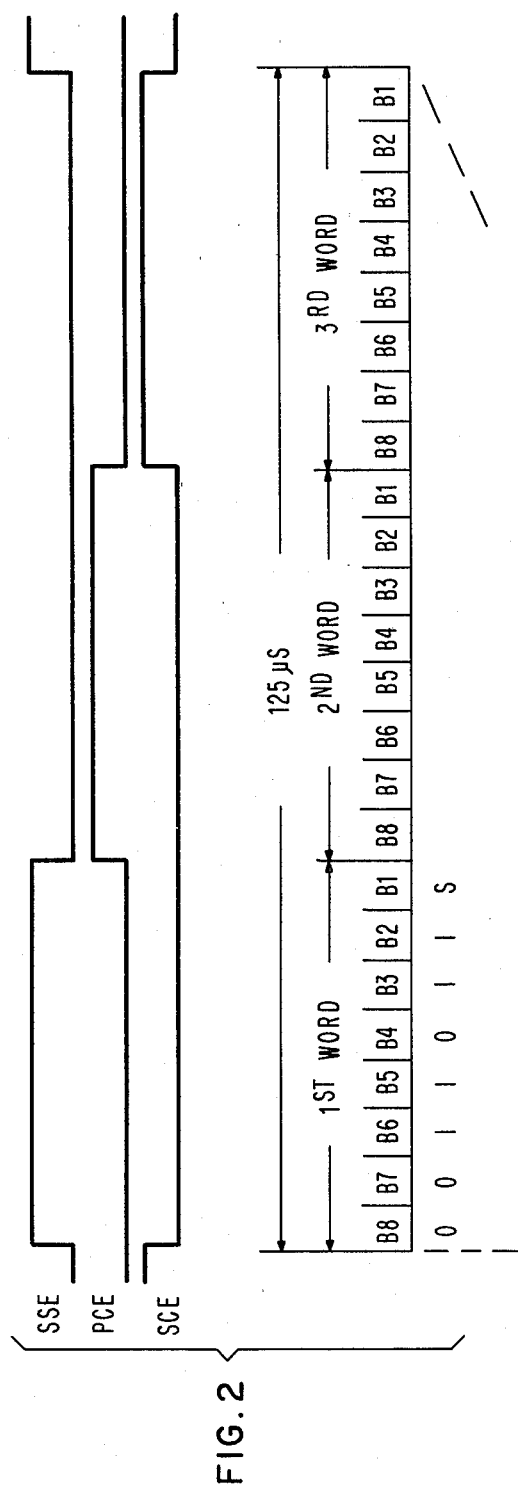
FIG. 2 is a timing diagram of a serial data frame employed in the apparatus of FIG. 1 and comprising three 8 bit words.
Figure 3:
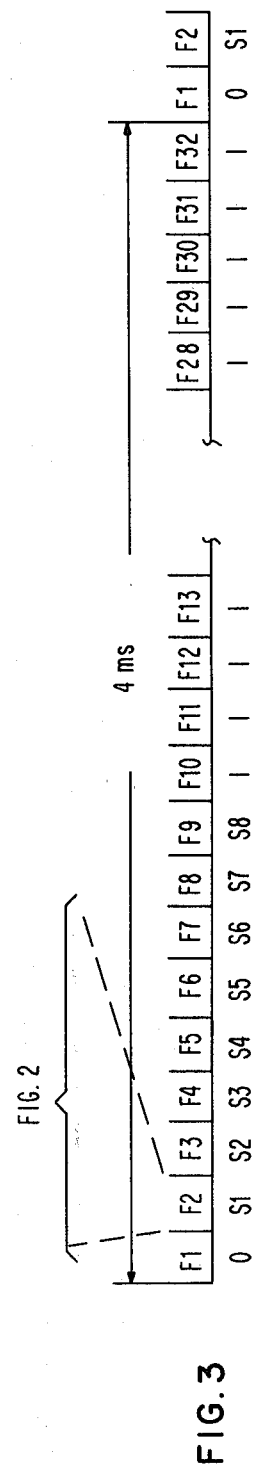
FIG. 3 is a timing diagram of a superframe employed in the apparatus of FIG. 1 and comprising 32 frames as shown in FIG. 2.

Frame format (FIGS. 2,3)

FIG. 2 shows an example of a frame format which may be used in the telephone apparatus according to the present invention. This example illustrates that, in principle, there exists no limitation on the number of PCM words in a frame. The number of words depends only upon the data rate used in this system. Obviously the data rate in kilobits per second (KB/sec.) must be matched to the needed speed in the telephone system to which the telephone apparatus is connected. In particular, the frame pattern must be synchronous with the PCM frame timing. In the described system, a multiple of the standard 8 KHz sampling rate is used.

Given the 8 KHz rate—that is, one sample every 125 microseconds—the number of words (samples) in each frame and the number of bits per word (sample) determines the frequency of the data pulses. Conventionally, each sample is defined by 8 bits or a byte of information. In the preferred embodiment of the present invention the number of samples per frame is two. Clearly, there is an upper limit to the frequency with which digital pulses may be transmitted to and from, and processed by the telephone apparatus. In particular, this upper limit is defined by the nature and length of the transmission line and the speed of the individual components of the telephone apparatus such as the transceiver, the synchronizer and, especially, the microcomputer. The telephone apparatus according to the present invention is designed for use with a 4,000 foot cable comprising two conventional twisted pairs of wires.

The standard PCM data rate of 64 KB/sec. (that is, the 8 KHz sampling rate times 8 bits per sample) sets the lower limit on the data rate of the telephone apparatus according to the invention. In addition to the PCM data it is necessary to transmit both synchronization and signalling information. Finally, if permitted by the maximum data rate, it is desirable to transmit at least one additional PCM voice of serial data stream.

According to the present invention, the telephone apparatus simultaneously transmits and receives one "frame" of information every 125 microseconds; that is, the standard PCM sampling rate for telephone systems. Each signal frame is divided into at least two equal, 8-bit time slots: one time slot for the synchronization and signalling information and at least one, but preferably two time slots for separate, independent channels carrying PCM voice data and/or digital data. With three time slots, the data rate is 3×64 KB/sec. or 192 KB/sec.

FIG. 2 shows the 125 microsecond frame divided into the three time slots. The three enable signals—sync/signalling enable SSE, primary channel enable PCE, and secondary channel enable SCE—are also shown to indicate their time relationship with the first, second and third words of the frame respectively.

The first seven bits (B8-B2) of the first word are set at the synchronizing code, which is preferably, alternately 0011011 and its inverse 1100100. The 8th bit (B1) in the first word, designated "S", is successively a start bit, one of 8 signalling bits and one of 23 stop bits.

The second word of the frame contains a single PCM speech sample of 8 bits (1 byte). The third word may contain either a PCM speech sample or a digital data word of 8 bits (1 byte). These second and third words are transmitted via the internal data bus IB of the telephone apparatus between the transceiver DTR and the primary codec/PCM filter (for the second word) and the secondary codec PCM filter or the DDI (for the third word).

It will be understood that the frame format may comprise only the first two words, or it may comprise more than three words, thus correspondingly increasing the number of transmission channels. If only two words are provided, the data rate will be 2×64 KB/sec. or 128 KB/sec. If more than three words are provided, the data rate must be correspondingly increased to permit transmission on each channel at the 64 KB/sec. rate.

FIG. 3 shows a "superframe" of 32 frames, each identical to the frame shown in FIG. 2. Each superframe has a transmission time of 4 milliseconds.

The first frame F1 of the superframe contains a start bit or "0" in the B1 bit position of the first word. The next 8 frames contain the signalling bits S1,S2 ... S8 in this bit position. The following 23 frames contain stop bits, or a "1", in the B1 bit position. With this arrangement, one signalling byte is transmitted to and from the microcomputer every four milliseconds. During the time that the frames F10-F32 are transmitted and received, the microcomputer has time to control other functions of the telephone apparatus.

As will be appreciated from the discussion above, the frame format according to the invention facilitates the transmission of two or more independent and simultaneous voice and/or data channels within one PCM frame and without any buffering. Consequently this format makes possible the provision of additional features, such as additional connections to peripheral units, without any change in the existing telecommunication system.

The frame format according to the invention also permits the extraction of a clock signal from the data information with no phase jitter thus allowing coherent operation between facilities.

Finally, the frame format provides optimized bandwidth for digital data transmission and alleviates out-of-band radio interference.

The Encoding Technique Using "Alternate Mark Inversion" (AMI) FIGS. 4-7

The alternate mark inversion (AMI) encoding technique has been used for digital trunk circuits with both PCM24 and PCM30 systems. If this encoding technique also is preferably employed in the digital telephone apparatus according to the present invention, this does not limit the basic architecture of this apparatus to such an encoding technique. It will become apparent from the later description of the receiver unit of the transmitter and receiver circuits that just relatively simple changes of the design have to be made for adjusting this circuitry to be used with different transmitting schemes, as for example, with the so-called "Ping-Pong" scheme. The choice of different encoding and transmitting schemes also is dependent upon requirements of the data rate to be achieved.

However, according to the present invention, the combination in using a specific frame formatting technique as herein described before and the AMI encoding scheme also allows transmitting of data together with voice information in a frame format of more than two channels. Therefore, a greater amount of extensions and other peripheral units can be connected to the switch in parallel. Furthermore, pairs of two-wire lines can be used which are balanced simply by twisting each two-wire line. Thereby, a greater cable distance between repeaters can be achieved and the cross-talk attenuation between the twisted pairs, which is decreasing with the frequency, is optimized.

In the AMI encoding scheme, basically a pulse is sent for every logical level "1" and no pulse is sent for a logic level "0". In addition to that simple "mark" and "no mark" scheme, the polarity of the pulse is inverted for every second logic level "1" which is sent. Furthermore, preferably the generated pulses approximate a raised cosine wave shape rather than a strict rectangular wave shape in order to minimize the influence of high order harmonics.

With recent advancements in the state of the art, telephone apparatus such as digital subscriber stations and digital attendant consoles have been developed in conjunction with electronic telecommunication systems, especially with key telephone systems and electronic private automatic branch exchanges typically using PCM techniques for speech digitalization with data rates in the range of 64 to 256 KHz. For such applications, varying cable lengths of up to 4,000 feet between the electronic switch and different subscriber sets are usually taken into consideration. With respect to these requirements, the chosen encoding scheme has the following advantages: the high cross-talk attenuation of pairs of twisted two-wire lines allows the use of commercially available and relatively inexpensive cables such as 25-pair cables which are especially useful in conjunction with multiple digital subscriber sets. Even with the mentioned variety of cable lengths stemming from the different loop lengths in the range of up to 4,000 feet, the circuitry can be designed such that no adjustments in the transmitter/receiver circuits are required to accomplish transmitting information across those different loop lengths. This is very important with respect to small implementation and installation costs. The transceiver unit also can be implemented with small outlay and still meet FCC requirements, since with this encoding scheme commercially available and just a few hardware components are required which need no specific measures for ventilating and take up minimal space.

DIGITAL TRANSMITTER/RECEIVER UNIT (TRANSCEIVER) FIGS. 4-7

Figure 4:
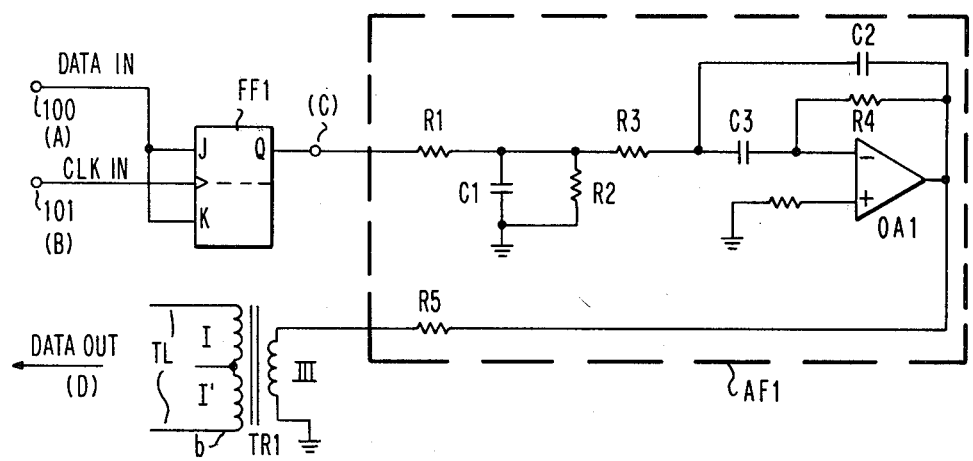
FIG. 4 is a schematic diagram of the transmitting portion of the digital transceiver shown in FIG. 1.
Figure 5:
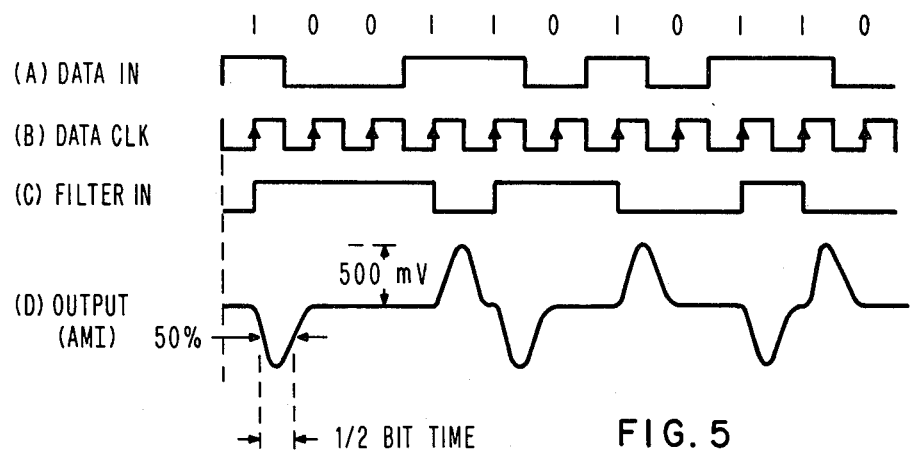
FIG. 5 is a timing diagram of a number of signals appearing in the transmitter shown in FIG. 4.
Figures 6, 6A:
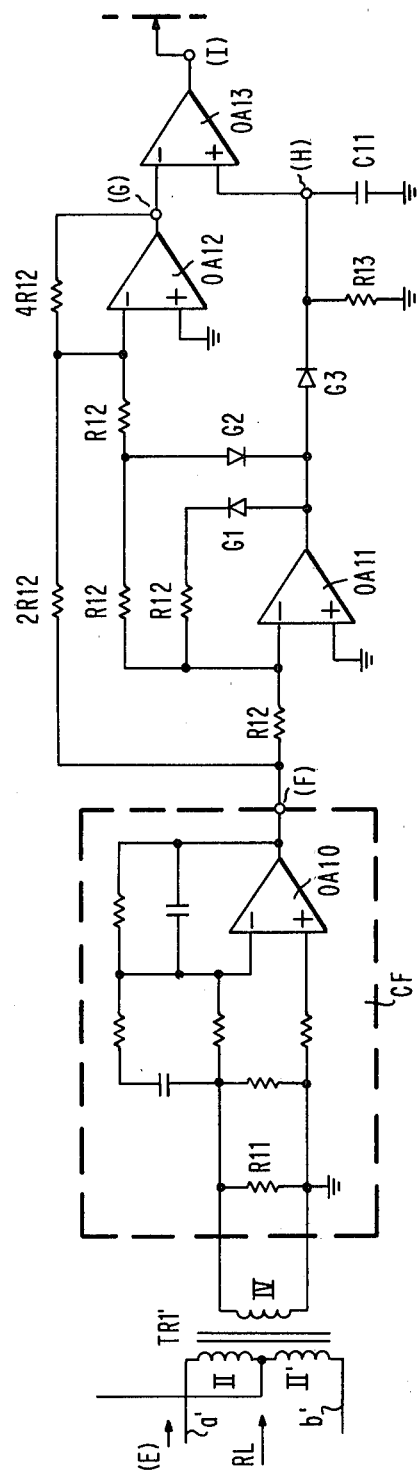
FIG. 6 is a schematic diagram of the receiving portion of the digital transceiver shown in FIG. 1.
Figure 7:
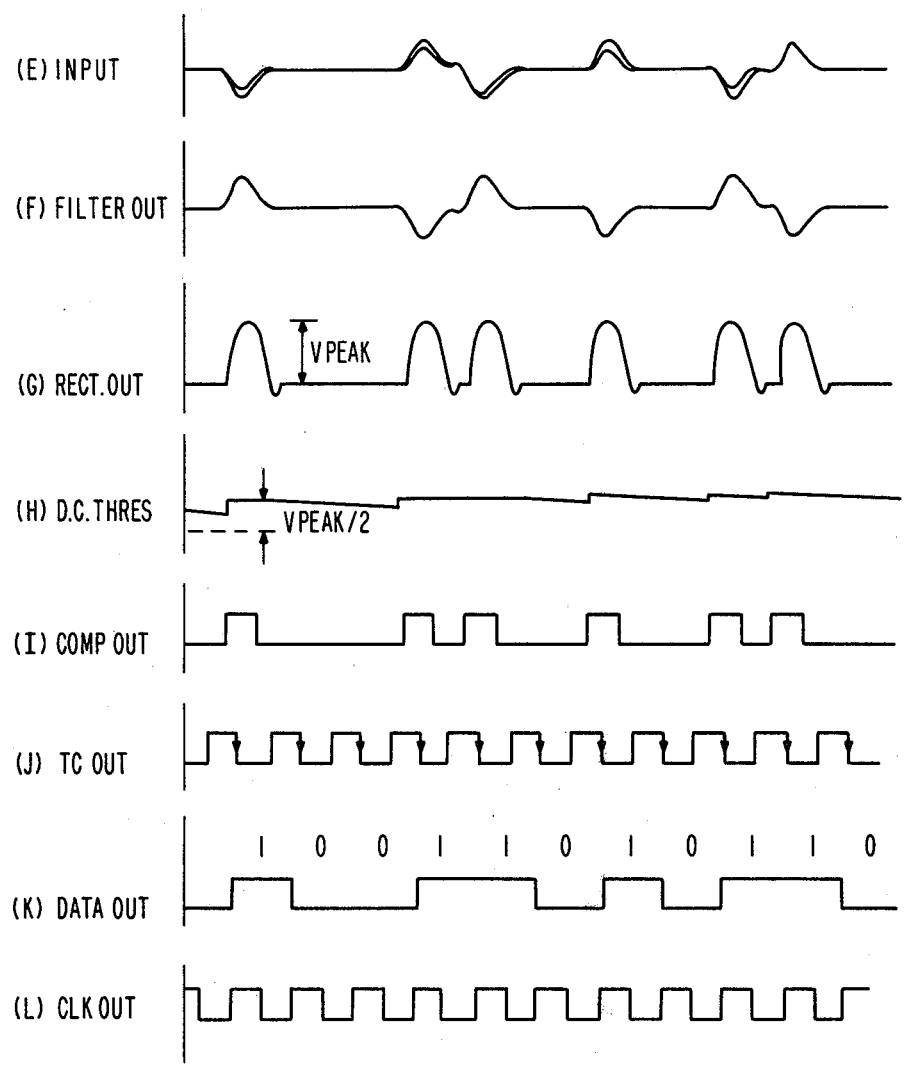
FIG. 7 is a timing diagram of a number of signals appearing in the receiver shown in FIG. 6.

In the block diagram of the architecture of the digital telephone apparatus of FIG. 1, the digital transmitter/receiver unit DTR has been shown in one block; for a better comprehension this transmitter/receiver unit DTR has been broken down into a transmitter unit DT and a receiver unit DR which are shown in detail in FIG. 4 and FIG. 6, respectively. FIGS. 5 and 7 represent respective timing diagrams of the transmitter unit DT and the receiver unit DR. In conjunction with the description of the block diagram of FIG. 1, it has been pointed out that the digital transceiver DTR is connected to the four-wire transmission line by the transformer TR1 for transmitting digitalized voice data, other digital data information, signalling information, and last but not least, synchronizing bits via the two wires of the transmission line TL by use of the primary windings I, I' and the secondary winding III. For receiving the same items of information the two wires of the receiving line RL are connected to the primary windings II, II' and thereby coupled to the secondary winding IV of the transformer TR1'.

The schematic of FIG. 4 representing the transmitter unit DT also shows the primary windings I, I' and the secondary winding III of the transformer TR1 and the two-wire pair a, b of the transmitting line TL. The transformer TR1 has an impedance transformer ratio of 1:4. Schematically indicated are a first input 100 for serially incoming data and a second input 101 for receiving data clock pulses. In view of the block diagram shown in FIG. 1, it has to be understood that these inputs 100, 101 represent the respective inputs of the digital transceiver DTR connected to the internal data bus IB, thereby receiving clock pulses and serial data from the primary and secondary codec PCM filters PCF and SCF, or from peripheral units such as the additional data system DDI.

The digital transmitter unit DT is provided with a JK flip-flop FF1 which is used as a toggle flip-flop, since both the J-input and the K-input of the flip-flop are commonly connected to the serial data input 100. The operation of the JK flip-flop FF1 is controlled by the train of data clock pulses received at the clock input 101. A normal Q-output of the JK flip-flop FF1 generates by means of the toggle function of the JK flip-flop data signals in the form of step functions in synchronism with the data clock pulse train. This characteristic is represented in the first three wave forms of FIG. 5. The reference symbols A through D at the left-hand margin are related to correspondingly labelled test points in FIG. 4 where these wave forms appear. Line A represents serially incoming data, line B the data clock pulse train and line C the data signals as generated at the Q-output of the JK flip-flop FF1. The wave forms of line A and line C represent the same series of items of data wherein each signal level "1" of the diagram in line C comprises a step function.

The output signals of the JK flip-flop FF1 have to be transformed into AMI encoded signals in the shape of a raised cosine wave form. This is achieved by a first active filter AF1 which is inserted between the output of the JK flip-flop FF1 and the secondary winding III of the transformer TR1. The active element of this filter is a first operational amplifier OA1 having an RC input network and a multiple feedback circuit. By means of this implementation the filter represents a shaping filter with a one pole band pass characteristic and a one-pole low-pass characteristic, which attenuates the higher order harmonics of the input signal. The values of the filter components are selected in conventional manner such that the open loop gain of the operational amplifier OA1 is at least 30 dB at data rate frequency. The positive and negative pulses are extremely symmetrical and approximate raised cosine pulses having a level of about 4 volts peak-to-peak at the output of the active filter AF1. The pulses are one-half of a bit time wide at their 50% amplitude points for optimum data recovery and clock construction at the receive end.

The output transformer comprising the secondary winding III and the first primary windings I, I' provides a means for feeding or receiving direct current power over the transmission line TL; this design is such that 40 dB longitudinal balance over the range of 20 KHz to 200 KHz is obtained. This prevents the transmission line from acting like an antenna. The wave form of the signal fed to the transmission line TL via the secondary winding III and the primary windings I, I' is represented in line D of FIG. 5. This pulse diagram shows all the characteristics of data signals to be transmitted via a transmission line TL. The binary information is AMI-encoded and the basic wave shape is formed such that the pulses resemble raised cosine wave forms rather than rectangular pulses. As pointed out, the pulses are about one half of a bit time width between the two 50% amplitude values, whereas each pulse in general is smaller than the full bit time such that the transfer of positive and negative pulses is achieved properly.

The second main unit of digital transceiver DTR forms the receiving part for processing the receiving data signal train. The main objects of this receiver unit DR are to recover from the incoming signal information a precise, stabilized clock pulse train and to detect the digital data information and convert it into the form of a bipolar, rectangular wave shape.

Figure 6B:
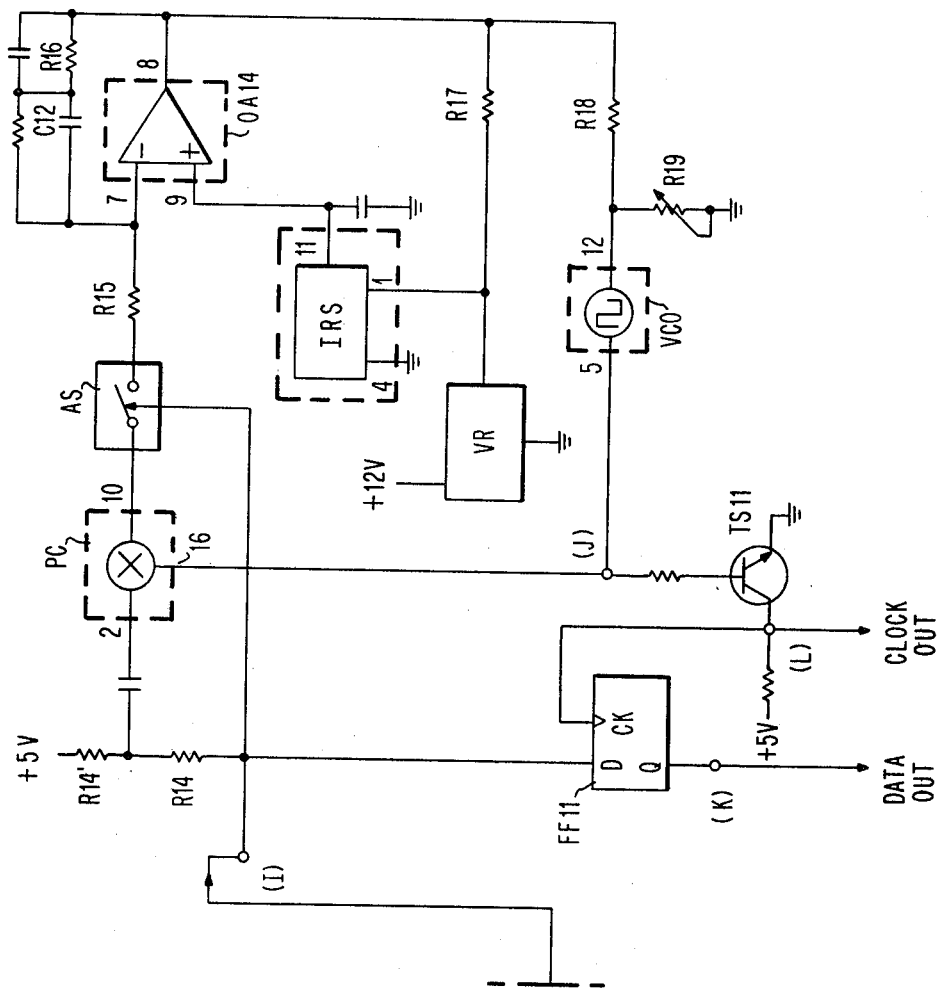

The detailed circuit diagram of the receiver unit is shown in two related FIGS. 6a and 6b. The arrangement of both figures with reference to each other is schematically indicated in FIG. 6.

At the left-hand margin of FIG. 6a there is represented the transformer TR1 with the second primary windings II and II' and the secondary winding IV. The second primary windings are connected to the two wires a' and b' of the receiving line RL. The transformer has the aforementioned impedance transforming ratio of 1:4. All information received across the two wire pair a', b' of the receiving line RL is supplied to a compensation filter CF which is designed for eliminating distortions of the received digital signals and minimizing out-of-band interference. The clean signal pulse train will then be processed furthermore in a pulse detector circuit including a full wave rectifier, an AC/DC converter and a comparator. In FIG. 6b it is shown that the output signals of the comparator are supplied to a D flip-flop forming the output stage for the serial digital data stream on the one hand and to a sampling circuit for recovering a clock pulse train.

A detailed description of the different components of the receiving unit DR of the digital transceiver DTR will now be given with reference to FIGS. 6a and 6b, respectively, in conjunction with timing diagrams shown in FIG. 7 which refer to different wave forms of signals appearing at specific test points of the circuitry which are referenced by letters E through L. It has been pointed out that different loop lengths of up to 4,000 feet between the electronic switch and different subscriber sets have to be taken into consideration. According to this variety of loop lengths the signal pulse train which is received from the receiving line RL is more or less distorted. The timing diagram E in the first line of FIG. 7 represents such an input signal pulse train in a wave shape as it occurs at the input side of the transformer TR1'. The wave shapes of the signals in the timing diagram E are shown in full lines with with varying amplitudes thereby indicating that amplitudes and wave shapes may vary dependent upon the history of the received signal. For obtaining a more general understanding it may be mentioned that the transmission line for the digital signals, here represented by the receiving line RL, tends to attenuate high frequency components, and therefore, has to some extent a characteristic of low-pass line.

Matching these input conditions, the compensation filter CF is designed as an active filter including another operational amplifier OA10. In the input circuitry of this operational amplifier there is arranged in parallel to the secondary winding IV of the transfomer TR1' an impedance transforming resistor R11 which is grounded at a connector tap coupled to the non-inverting input of the operational amplifier OA10. The remaining parts of the input network of the second operational amplifier OA10 form a RC network of relatively high impedance which has basically low-pass characteristics. A multiple feedback circuit of the operational amplifier OA10 primarily consists of a parallel RC circuit which results in a high-pass feedback. This design conventional to those familiar with active filters provides a compensation filter CF with a characteristic having at least to some extent a gain in the frequency range of up to 100 KHz and creating a small loss at higher frequencies of up to 200 KHz. Thereby, maximum performance is achieved in this frequency band. At the output of the operational amplifier OA10 which is identical with the output of the compensation filter CF, an undistorted inverted output signal pulse train occurs. This wave form is shown in the second line of FIG. 7 as indicated by the reference symbol F.

The following sub-unit of the receiver part of the digital transceiver above all serves to convert the bipolar output signals of the compensation filter CF into unipolar rectangular pulses. There is arranged a third operational amplifier OA11 having an input load resistor R12 and a first and a second feedback circuit each including another resistor R12 connected in series with a diode G1, G2, respectively. Both diodes are connected in anti-parallel to the output of the operational amplifier OA11. This implementation is such that for both positive and negative values of the input signal the operational amplifier just operates as an inverting switch.

The connecting point between the second diode G2 and the second feedback resistor R12 furthermore is coupled to another load resistor R12 connected to the inverting input of a fourth operational amplifier OA12. The non-inverting input of this operational amplifier is grounded. The inverting input of this operational amplifier OA12 also is connected by another resistor 2R12 to the output of the compensation filter CF on the one hand and to a feedback circuit including a further resistor 4R12 on the other hand. As indicated by means of the reference symbols of the resistors the circuit implementation is such that the resistances are multiple integrals, this is by the way of an example, if R12 equals 5 K$\Omega$, then 4R12 will be 20 K$\Omega$.

The operational amplifier arrangement forming a full wave rectifier is implemented in a conventional manner and is relatively straightforward. An analysis of the circuit, therefore, is relatively easy to those skilled in the art. A positive-going input signal occurring at the output of the compensation filter CF drives the output of the third operational amplifier OA11 negative and the second diode G2 becomes conductive. The opposite applies to an input condition when a negative-going pulse occurs. The basic amplification factor of the rectifying operational amplifier OA12 in both cases is determined by the ratio of the feedback resistor 4R12 and the respective effective resistors of the input circuit of this operational amplifier and has an absolute value of 2. The only difference is that the output signal is in phase with a positive-going input signal whereas the output signal is out of phase by 180° when the input signal is negative. Thus, a unipolar signal train is generated at the output of the rectifying operational amplifier OA12 which is represented by the wave forms in line G of FIG. 7.

The third operational amplifier OA11, furthermore, has a specific object in conjunction with an output circuit including a third diode G3 connected by its anode to the cathode of the second diode G2 and including a parallel RC circuit comprising a further resistor R13 and a capacitor C11 which are connected to ground. The values of this RC circuit are chosen such that a fairly high time constant is established which generates a variable DC threshold signal at the cathode of the third diode G3. The wave form of this threshold signal is shown in line H of FIG. 7.

This threshold signal is applied to the non-inverting input of a voltage comparator OA13 whose inverting input is connected to the output of the rectifier stage, that is, the output of the fourth operational amplifier OA12. The voltage comparator amplifier OA13 thus forms a pulse detection stage under control of a variable DC threshold voltage which is kept at one-half the peak amplitude of the unipolar pulses occurring at the output of the rectifying operational amplifier OA12 and represented in line I of FIG. 7. Thus, within a relatively wide dynamic range of about 20 dB the detector generates, in case of an input signal which represents a signal level "1", a pulse of a length of one half of a bit time.

It should be indicated that the performance of the pulse recovering scheme, at least to some extent, is dependent upon the characteristics of the diodes involved. These diodes have relatively low reverse leakage and moderately fast switching characteristics. The first diode G1, as well as providing feedback to the second operational amplifier OA11 on positive output swings, balances the voltage drop at the third diode G3, thereby achieving linear tracking between the threshold voltage and the peak amplitude of the unipolar pulses at the inverting input of the comparator OA13

The circuit shown in FIG. 6b which is connected to the output of the voltage comparator OA13 (shown in FIG. 6a) mainly has the object to reconstruct the 192 KHz clock and to generate an output data pulse train synchronized with the clock. Prior to a detailed description of the respective circuitry it may be useful to analyze the signal pulse train occurring at the output of the voltage comparator OA13 for obtaining a better background understanding of the purpose of this circuitry.

The output signals of the comparator stage as shown in line I of FIG. 7 represent rectangular pulses of a signal level "1" in a random order. Since "zero" bits in the stream of data are not accompanied by a change of the signal level, the clock pulse has to be recovered entirely from the pulses representing data bits with signal level "1". Long strings of data bits with signal level "0", therefore, are a worst case which has to be taken into consideration and which must not affect the clock recovering scheme. For implementing the clock recovering scheme a phase-locked loop circuit is employed which is designed for sampling each consecutive pulse at the output of the fifth operational amplifier OA13 and for maintaining signal condition without any change until the next pulse occurs. This simply means that the information between two consecutive pulses is skipped by sampling circuit.

A series of pulses occurring in a random order in view of its frequency spectrum also is a relatively complex subject matter. It may be well understood by those skilled in the art that a poorly designed phase-locked loop circuit in this situation could be locked onto a frequency which is higher or lower than the 192 KHz pulse train. The clock frequency, however, is the far most significant frequency in the spectrum of a continuous string of data bits of signal level "1". To maximize the energy in the spectrum at the clock frequency of the transmitted signal the compensating filter and the pulse detection stage have been designed such that the pulse at the output of the voltage comparator OA13 are approximately.

Based upon this introduction the clock reconstruction circuit will now be described in detail with reference to FIG. 6b. The output of the pulse detection stage represented by the voltage comparator OA13 is connected via a voltage divider comprising further resistors R14 and R14' to supply voltage, on the one hand, and to the information input of a D flip-flop FF11 on the other hand. A connector tap of both resistors R14 and R14' is coupled via a further capacitor to an input of a quadrature phase comparator PC having an output labelled 10 and a control input 16.

The output is connected to the inverting input of a fifth operational amplifier OA14 via an analog switch AS and an input resistor R15. The analog switch is controlled by the output signal of the fifth operational amplifier OA13. The fifth operational amplifier OA14 is provided with a multiple feedback circuit including a further capacitor C12 and a further resistor R16 which are arranged in series. A small capacitor is in parallel with resistor R16 to filter mixer harmonics present in the output of phase comparator PC. A very large value resistor in parallel with capacitor C12 provides a DC path to the inverting input of the amplifier OA14 when the analog switch AS is opened. Thus, the fifth operational amplifier OA14 and its feedback network operate as an integrator, straight amplifier, or low pass filter depending on the frequency of the input signals passed to the inverting input of the fifth operational amplifier OA14. The non-inverting input of the fifth operational amplifier OA14 is supplied with a DC signal generated by an internal reference source IRS. The output of the operational amplifier OA14 is coupled by a further series resistor R16 to a current control oscillator CCO which output also is directly connected to an input of the internal reference source IRS. The output of the sixth operational amplifier OA14, furthermore, is connected to ground via a further resistor R17 and an adjustable resistor R18 which are arranged in series. The connector tap between both resistors is linked by a threshold circuit TC to the control input of the phase comparator PC and, in addition to it, to the base of a transistor TS11 having a grounded emitter and a collector forming an output of the recovered clock pulse train.

It may be mentioned that the devices of this phase recovering circuit are entirely composed of commercially available components and integrated circuits. In fact, the phase comparator PC, the operational amplifier OA14, the internal reference source IRS and the voltage controlled oscillator VCO are integrated together into one phase-locked loop device manufactured by EXAR as its device 2212. This is indicated in the drawing by blocks in dotted lines and by pin reference symbols of the manufacturer. The voltage regulator VR can be implemented by a device 78L05 of National Semiconductor Corporation.

It is, therefore, deemed not to be necessary to describe the function of this pulse recovering scheme in all details, since the basic requirements and the mode of operation to be achieved have been explained in the introductory section of this circuit. Some special characteristics, however, will be pointed out in the following.

The analog switch AS is closed whenever a pulse representing a data bit of signal level "1" occurs at the output of the fifth operational amplifier OA13. Thereby the output of the phase comparator PC is sampled and the phase error sample is applied to the input resistor R15 connected to the inverting input of the fifth operational amplifier OA14. Amplifier OA14 in turn changes capacitor C12 for a duration of time equal to the width of the error sample with a direction determined by the polarity of the error sample. The voltage across C12 changes the frequency of the voltage controlled oscillator VCO in a direction which minimizes the phase error. The zero phase error point for the combination of the quadrature phase comparator PC and the analog switch AS occurs when the positive transistion of the voltage controlled oscillator output is in the middle of the output pulses from the voltage comparator OA13. This timing, in turn, is the optimum time for deciding whether a data pulse having a signal level "1" at the output of the voltage comparator OA13 has occurred.

The output signal of the sixth operational amplifier OA14 is applied to a resistor network including resistors R18 and R19. Resistor R19 determines the center frequency of the phase-locked loop circuit by means of the voltage drop across the resistor which voltage is effective at the input of the threshold circuit TC. The series resistor R18 then specifies the upper and lower boundaries, or, in other words, the maximum deviation from the center frequency.

The output signal of the voltage controlled oscillator VCO as indicated by the reference symbol J is represented in the wave form of line J of FIG. 7. This signal is applied to the control input of the phase comparator PC and is amplified and, above all, inverted by means of the transistor TS11. The transistor output signals form the recovered clock pulse train which is shown in line L of FIG. 7. This clock pulse train also is used to control the D flip-flop synchronizing the stream of data bits occurring at the output of the comparator stage with the recovered clock pulse train.

Figure 8:
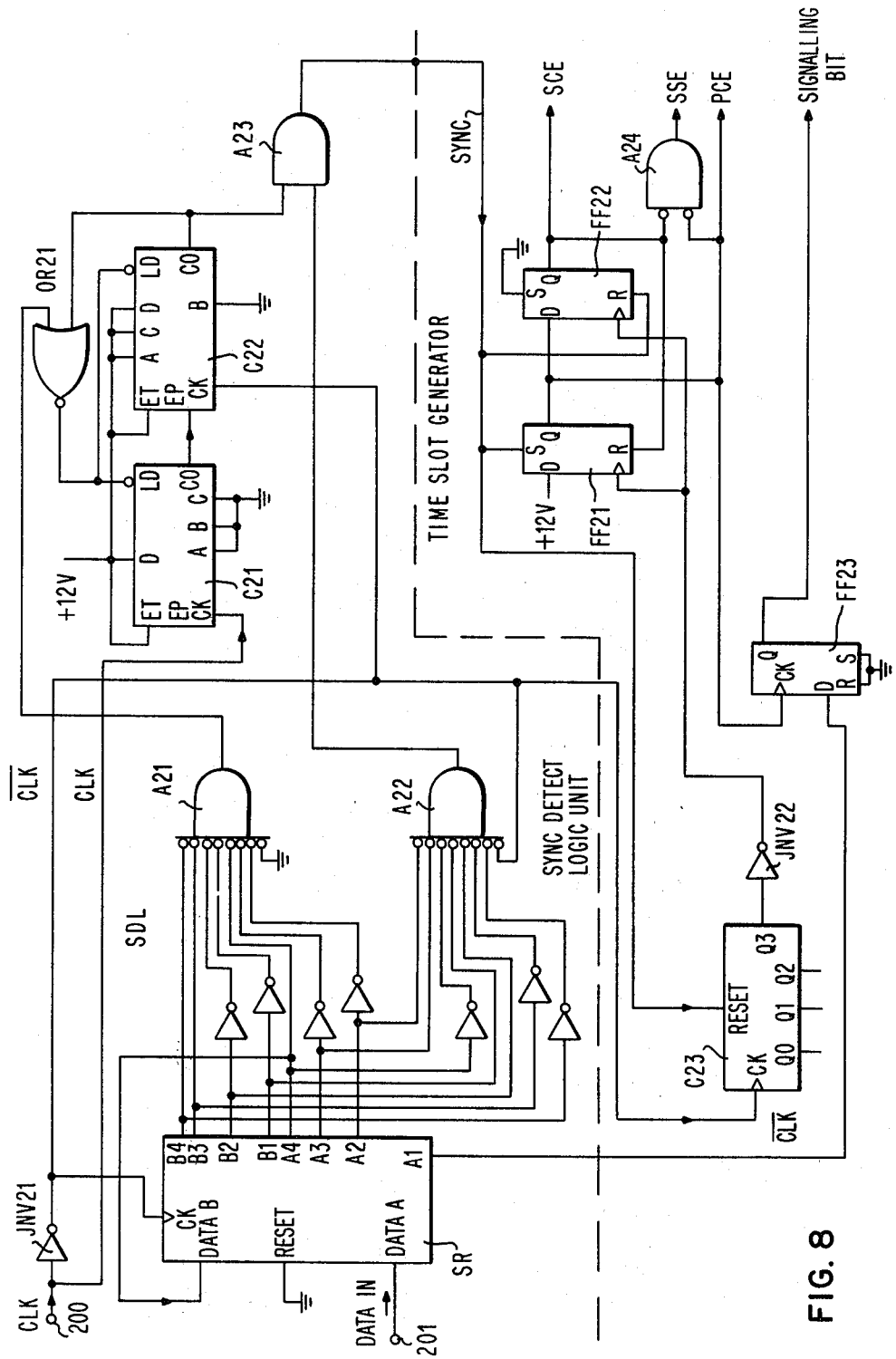
FIG. 8 is a schematic diagram of the serial frame synchronizer shown in FIG. 1.
Figure 9:
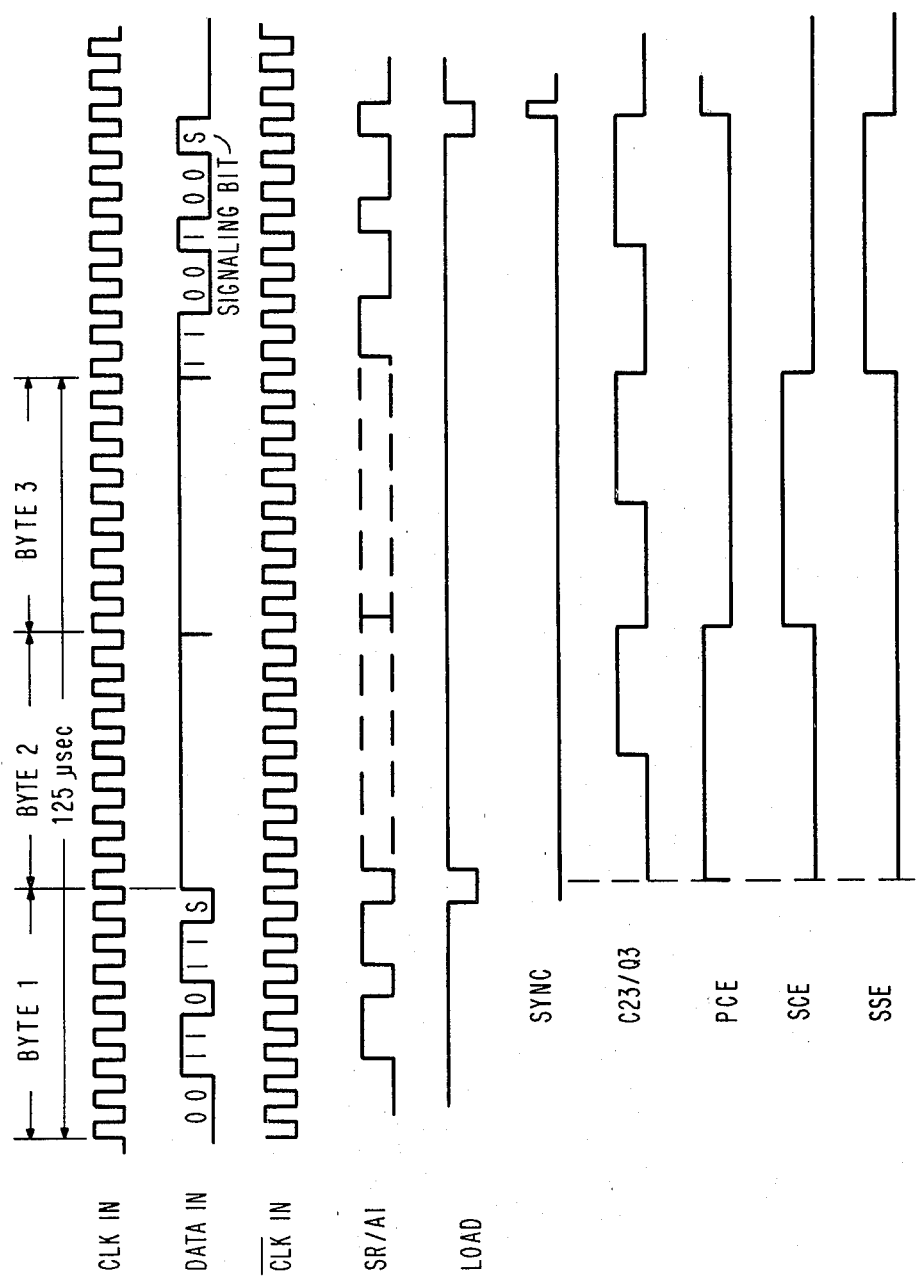
FIG. 9 is a timing diagram of a number of signals appearing in the serial frame synchronizer shown in FIG. 8.

Serial Frame Synchronizer SFS (FIGS. 8, 9)

It has been pointed out that the serial data rate, employed in the digital telephone apparatus according to the present invention, is 192 Kbit/sec. With reference to FIGS. 2 and 3, it has been described that each serial data frame format includes three bytes, each comprising eight bits. In each frame format one of these bytes has the characteristic of the synchronizing/signalling byte composed of seven synchronizing bits and a signalling bit.

By means of the synchronizing bits, the frame formats of a continuous serial data stream can be detected by the serial frame synchronizer SFS. By evaluating the time of the occurrence of the synchronizing bits within the serial data stream the three bytes of a frame format which are generated and transmitted independently of each other are identified. For this reason the seven bit code which consists of the synchronizing bits has to have very low correlation with any encoded data information neither normal data information nor an idle channel code. Statistical studies have proved that the bit series of 0011011 does follow these requirements. Accordingly, the inverted synchronizing bit code comprises of the series 1100100.

The serial frame synchronizer is mainly composed of three sub-units, a serial-to-parallel converter for converting the information received at the serial data stream into a parallel 8-bit format, a logic unit for continuously evaluating the current state of the serial-to-parallel converter and a time slot generator for producing under control of a synchronizing pulse three output signals each occurring concurrently with a respective one of the three bytes of a frame.

In accordance with the block diagram of FIG. 1, the serial frame synchronizer SFS receives a 192 KHz clock at a clock input 200 and serial data at a data input 201. Forming the serial-to-parallel converter in the serial frame synchronizer SFS there is arranged a shift register SR. The shift register SR is implemented as a double four-bit shift register with two corresponding serial data inputs DATA A and DATA B, respectively and two sets of four parallel outputs A1 through A4 and B1 through B4. These two four-bit shift registers are cascaded by short-circuiting the most significant output A4 of the first stage with the second serial data input DATA B. The first serial data input DATA A is connected to the data input 201 of the serial frame synchronizer SFS. The operation of the shift register SR is controlled by clock signals CLK which are inverted by an inverter I21 with respect to the clock signal pulse train CLK supplied to the clock pulse input 200. For detecting the seven synchronizing bits of a frame format there is arranged the synchronizing detect logic unit at the output of the shift register SR. It comprises a straightforward logical network composed of a series of inverters and two AND-gates A21 and A22. Each of the inverted inputs of the AND-gates is coupled to a respective one of the most significant parallel outputs A2 through A4 and B1 through B4 of the shift register SR either directly or by one of the inverters. The AND-gates A21 and A22 thus are all zero detectors and are alternatively supposed to be operative if the current state of the shift register SR reflects either the normal or the inverted synchronizing bit pattern.

It has been described hereinbefore that consecutive frames have the characteristic that alternatively a normal and the inverted synchronizing bit pattern occurs. For fail-safe operation, it is now evalutated that for two consecutive frames both the normal and the inverted synchronizing bit pattern occur within a given distance determined by the data frame format. This is achieved by counting the clock pulses occurring after having detected one of the synchronizing bit patterns and by evaluating the status of the shift register SR one pulse frame later if then the inverse synchronizing bit pattern is present.

To perform this operation there is arranged at 24-bit counter in accordance with the chosen frame format which is implemented by means of two cascaded 16-bit counters C21 and C22. The first counter C21 is controlled by the 192 KHz clock signal CLK received at the clock pulse input 200 of the serial frame synchronizer SFS. It produces a carry output signal at its carry output CO when the maximum count is reached. This output signal is fed as a count-enable signal to a count enable input EP of the second counter C22 which is controlled by the inverted clock pulses $\overline{CLK}$. Both counters are preset in common to a predetermined starting count by a preset signal applied in parallel to their load inputs LD. This preset signal is generated at the output of an OR-gate OR21 having two inputs each connected to a respective one of the outputs of the first AND-gate A21 and the carry output CO of the second counter C22. Thus, an output signal at the carry output CO of the second counter C22 occurs whenever 24 bits of the 192 KHz clock pulse train have passed. In other words, the signal condition of the first AND-gate A21 detecting a synchronizing bit pattern is buffered for exactly one pulse frame and is then appearing at the carry output CO of the second counter C22.

At this time, the second AND-gate A22 of the synchronizing detector logic unit is supposed to carry a signal of signal level "1", if the bit pattern occurring one pulse frame earlier in fact was a synchronizing bit pattern. The signals occurring at the carry output CO of the second counter C22 and the second AND-gate A22 are logically linked by a further AND-gate A23 which produces an output signal of signal level "1" occurring exactly once after each series of 48 pulses of the 192 KHz clock pulse train CLK. This output signal of the AND-gate A23 is the synchronizing signal SYNC locking the serial data stream to the correct frame format.

The described circuit is implemented with a minimum of hardware and has a very high noise immunity. Once both synchronizing bits in form of the output signals of the AND-gates A21 and A22 are detected, the circuit remains locked with these synchronizing bits. The only time that the circuit may lose synchronization is when the synchronizing signal is slipped. But any noise associated with the synchronizing bits will not cause the circuit to loose synchronization once the synchronized status is detected.

The synchronizing signal SYNC controls the time slot generator for locating the three different bytes in a frame by means of the three timing signals "Synchronizing/Signalling Enable" SSE, "Primary Channel Enable" PCE, and "Secondary Channel Enable" SCE. Each of these signals occurs one after the other and specifies during its signal level "1" a time period for the occurrence of a respective one of the three bytes of a frame.

For obtaining this operation the time slot generator is provided with a further 8-bit counter C23 which receives the inverted clock pulses $\overline{CLK}$ at its clock input. The counter is designed as a divide-by-eight counter and produces at its Q3 output a 24 KHz pulse train which is inverted by a further inverter I22 and, in common, applied to clock inputs of two further D flip-flops FF21 and FF22. A Q-output of the first flip-flop FF21 of the time slot generator is connected to the D-input of the second flip-flop FF22. The Q-output of the second flip-flop FF22 is connected to the reset input of the first flip-flop FF21 of the time slot generator. Thus, resetting of the first flip-flop FF21 is accomplished whenever the second flip-flop FF22 is set.

As will be explained in the following the first flip-flop FF21 in its set condition generates the primary channel enable signal PCE whereas the second flip-flop FF22 in its set condition carries the secondary channel enable signal at its Q-output. Both signals are applied to a respective one of the inverted inputs of a further AND-gate A24 which is operative if both the primary channel enable signal PCE and the secondary channel enable signal SCE are at signal level "0". Thus, the output signal of this further AND-gate A24 generates the sync-/signalling enable signal SSE.

In the time slot generator there is provided a further D flip-flop FF23 having a data input D connected to the least significant output A1 of the shift register SR and a clock input which is connected to the Q-output of the first flip-flop FF21 of the time slot generator. The D flip-flop FF23 operates as a synchronizer for detecting the signalling bit which is present at the least significant output of the shift register at a time concurrently with the rising edge of the primary channel enable signal PCE.

The operation of the serial frame synchronizer which implementation has been described hereinbefore will now be pointed out with reference to various timing signals shown in FIG. 9. The first line represents the 192 KHz clock pulse train CLK as applied at the clock input 200 to the serial frame synchronizer SFS. The stream of serially incoming data which is received at the data input 201 of the serial frame synchronizer is shown in the second line of FIG. 9. In the left hand and the right hand margin of this pulse train is assumed that two consecutive patterns of synchronizing bits appear. Derived from this signal condition, the alignment of the frames is indicated on top of FIG. 9. The third line of FIG. 9 shows the wave form of the clock pulse train in inverted form which is referenced as $\overline{CLK}$.

These three pulse trains form the input signals of the serial frame synchronizer SFS from which signals all the remaining wave forms shown in FIG. 9 are derived. The fourth line of FIG. 9 represents the operation of the shift register SR by means of the output signal occurring at the least significant output A1 of the shift register SR. As to be seen from comparison with the data stream shown in line 2, the output pulses have a delay of half the bit time which is resulting from controlling the shift register SR by the inverted clock pulses $\overline{CLK}$. In the fourth line there is shown the timing of the load pulses applied to the counters C21 and C22 which pulses are produced at the output of the OR-gate OR21. These signals occur if the signal pattern at the most significant outputs A2 through A4 and B1 through B4 of the shift register SR reflects the synchronizing bit pattern. The signals also can be determined by the carry output signal of the second counter C22 of the serial frame synchronizer. These signals occur in a synchronized mode of operation every 24 bits of the inverted clock pulse train $\overline{CLK}$.

The sixth line shows the timing of the synchronizing bit SYNC which is identical with the output signal of the AND-gate A23. This signal is applied to both a reset input of the third counter C23 and the set input of the first D flip-flop FF21 of the time slot generator. Thus, the third counter C23 is reset to zero and will carry an output signal at its Q3-output eight clock pulses later. At the same time the first D flip-flop FF21 is set thereby generating at its Q-output the primary channel enable signal PCE. The next "1" to "0" transition of the output signal of the third counter C23 enables the second flip-flop FF22 of the time slot generator to load the data information applied to its data input D. The second flip-flop in its set condition generates the secondary channel enable signal SCE and a reset signal for the first flip-flop FF21. Thereby it is accomplished that the next following transition from "1" to "0" level of the output signal of the third counter C23 cannot reactivate the first flip-flop FF21 which status, therefore, remains unchanged for two consecutive clock pulses.

The same clock pulse however which is blocked at the first flip-flop FF21 drives the second flip-flop FF22 into its reset state. Thereby, the secondary channel enable signal is turned off and furthermore the first flip-flop FF21 of the time slot generator becomes unlocked and can be set again by means of the following clock pulse. Since both flip-flops FF21 and FF22 are thus reset for a period of eight 192-KHz-clock pulses between the trailing edge of the secondary channel enable signal SCE and the rising edge of the primary channel enable signal PCE, the sync/signalling enable signal SSE will be generated at the output of the AND-gate A24. The timing of the three enable signals PCE, SCE and SSE may be obtained from lines 8-10 of FIG. 9.

Figure 10:
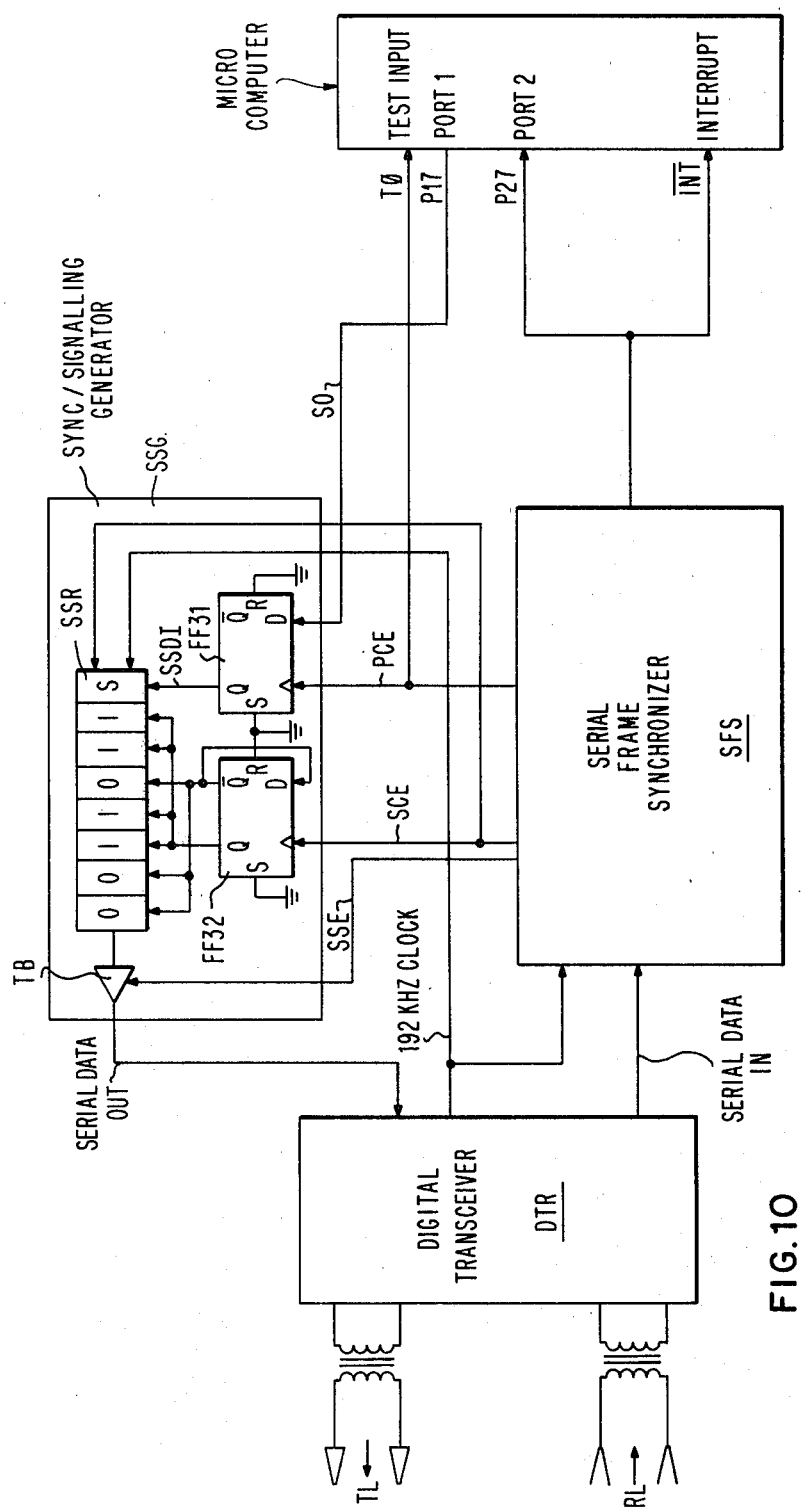
FIG. 10 is a schematic diagram of the sync/signalling generator shown in FIG. 1.
Figure 11:
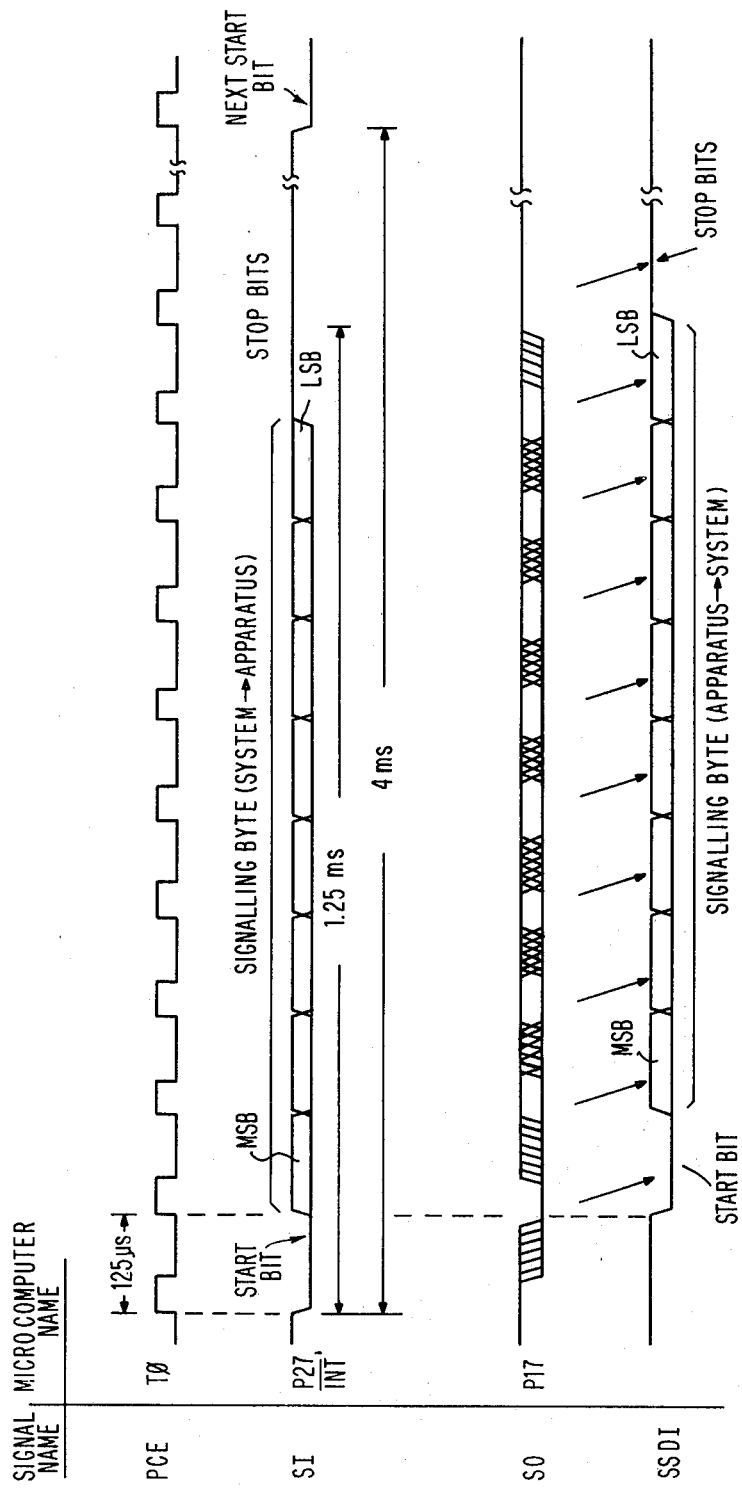
FIG. 11 is a timing diagram of a number of signals appearing in the sync/signalling generator of FIG. 10.

Sync/Signalling Generator (FIGS. 10 and 11)

The internal structure of the sync/signalling generator SSG, as well as its interrelationship with the digital transceiver DTR, serial frame synchronizer SFS and the microcomputer M is shown in FIG. 10. As noted above, the digital transceiver passes digital data in the prescribed frame format to the serial frame synchronizer SFS via the "serial data in" line of the internal data bus. The digital transceiver also receives digital data in this frame format via the "serial data out" line of the internal data bus for transmission on the telephone line TL. Finally, the digital transceiver generates a 192 KHz clock signal from the signals received from the transmission line RL. The 192 KHz clock is passed to both the sync/signalling generator SSG and the serial frame synchronizer SFS, as well as to other components of the digital telephone apparatus (not shown in FIG. 10).

The serial frame synchronizer SFS passs one bit of each 125 microsecond frame to both the P27 input port of the $\overline{INT}$ interrupt input of the microcomputer M. This bit appears in the B1 bit position of the first data word in the frame and may be a start bit, a signalling bit or a stop bit.

As explained previously, the serial frame synchronizer produces three enable signals: sync/signalling enable SSE, primary channel enable PCE and secondary channel enable SCE. These three signals are passed to the sync/signalling generator SSG. The signal PCE is also passed to the TO or "test input" port of the microcomputer M.

The microcomputer successively generates start, signalling and stop bits and passes these to the sync/signalling generator via its output port P17 and the line S0. These bits are successively latched into a flip-flop FF31 for subsequent insertion in the B1 bit position of a shift register SR via an input line SSDI. The synchronization code 0011011, and its inverse 1100100 are inserted in the SSE shift register SSR from the two outputs of a second flip-flop FF32. This second flip-flop is clocked once per frame by the secondary channel enable signal SCE. This flip-flop is configured to divide the SCE pulses by two so that it toggles upon receipt of each SCE pulse.

The shift register SSR also receives the secondary channel enable signal SCE. When this enable signal is present, the shift register may be loaded, and it will hold its contents without shifting. Upon termination of the SCE signal the shift register will shift its contents out at the 192 KHz clock rate via a tri-state buffer TB. This buffer is enabled by the sync/signalling enable signal SSE to pass the contents of the shift register SR to the "serial data out" line of the internal data bus. The tri-state buffer isolates the shift register from the "serial data out" line during the periods that the second data word and third data word of a frame are transmitted.

FIG. 11 shows the timing of the signals appearing on the lines in FIG. 10 for the period of 1 superframe (4 milliseconds). As is shown, the microcomputer M receives a start bit at its inputs P27 and $\overline{INT}$ coincident with the leading edge of the primary channel enable signal PCE. Similarly, a start bit appears at the output of the flip-flop FF31 on line SSDI upon appearance of the leading edge of the next subsequent pulse of the signal PCE. Thus, all the start, signalling and stop bits are received one 125 microsecond frame earlier by the microcomputer M than the bits passed to the shift register via the first flip-flop FF31, due to the single frame delay introduced by this flip-flop. The use of the flip-flop FF31 to store one bit for one frame period is necessary because the microcomputer is timed by the receipt of a bit and only thereafter does it send a bit out from its output port P17.

The microcomputer M initially establishes synchronism with the superframe by monitoring the bits appearing at its input P27 for 23 stop bits and a subsequent start bit. Once synchronism is established, the microcomputer disables its interrupt $\overline{INT}$ after receiving 8 successive signalling bits until shortly before it expects to receive the next start bit. In this way, the microcomputer will not be interrupted by a stop bit which is erroneously a "0" when it should be "1", so that it will continue to attend to its other functions as the stop bits are received. The microcomputer operates asynchronously from its own high frequency clock. Microcomputer software or firmware is used to determine the expected times of arrival of the pulses on line SI.

Since there is no handshake or echo operation in the communication between the telephone apparatus according to the invention and the telephone system to which it is connected, there is a need for redundancy in the signalling information transmitted to avoid problems upon receipt of an incorrect signalling bit. An incorrect signalling bit can cause the telephone apparatus to function improperly not only during calls but also between calls, since the apparatus is continually "on" as long as it is connected.

Assuming a typical bit error rate of $1 \times 10^{-7}$ (1 incorrect bit out of every 10 million) a bit error would occur every:

$$(10^7 \text{ bits}/1 \text{ error}) \times (1 \text{ Sec}/192 \times 10^3 \text{ bits}) = 52.083 \text{ secs/error}$$

Assuming an equal probability of any of the three words comprising the 24 bit frame of being the word with the bit error, a bit error in the sync/signalling word (first word) would occur every:

$$(52.083 \text{ secs/bit error}) \times (3 \text{ bytes/frame}) = 156.25 \text{ secs/error}$$

According to the invention, this bit error rate has been increased to an order of magnitude of years per error by sending each signalling word (byte) to the microcomputer 3 successive times. The microcomputer compares the three bytes, bit by bit, and responds to the signalling command only if at least two of the three bytes are equal. Thus, the microcomputer responds to the majority vote of the signalling bytes.

Figures 12, 12A:
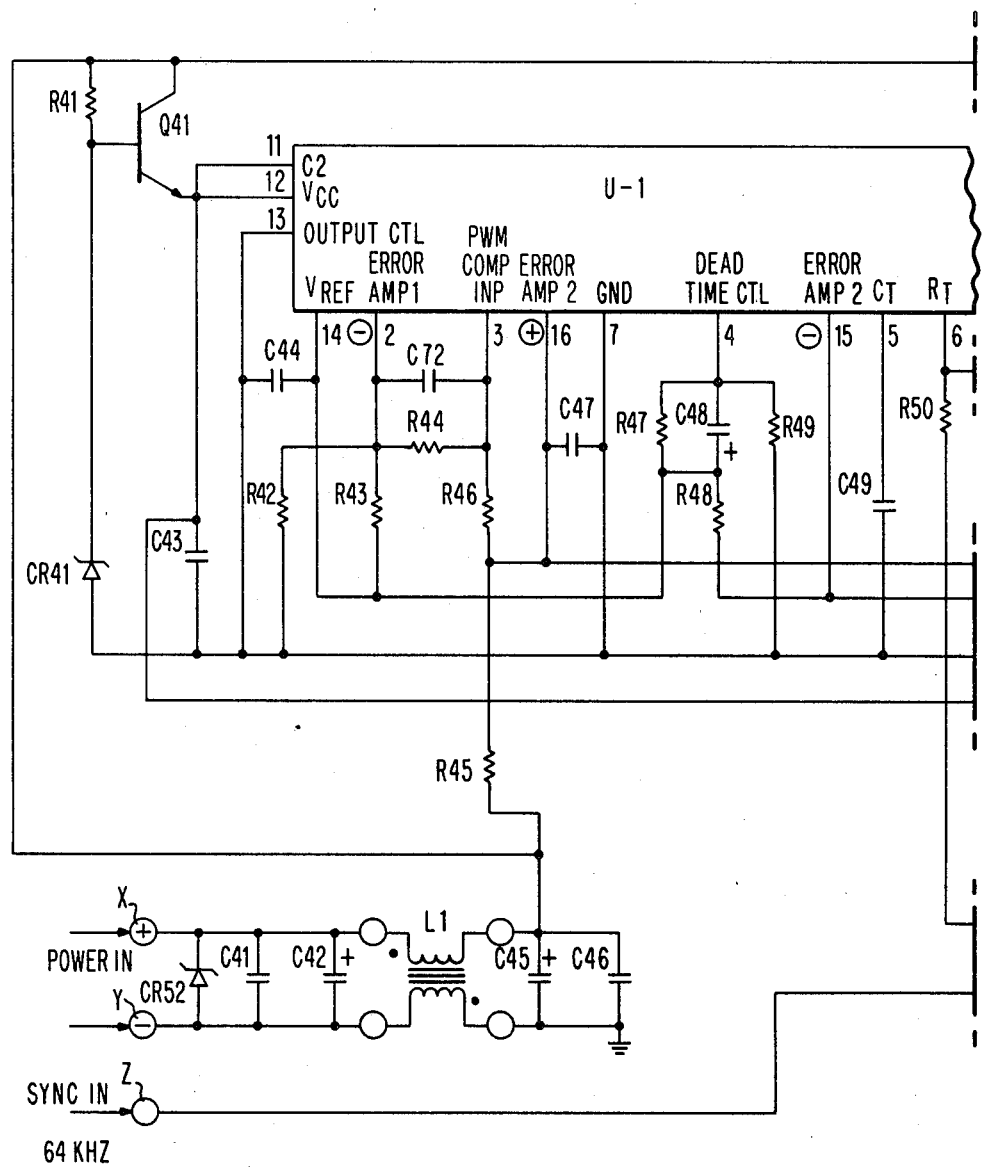
FIG. 12 is a schematic diagram of the DC/DC converter shown in FIG. 1.
Figure 12B:
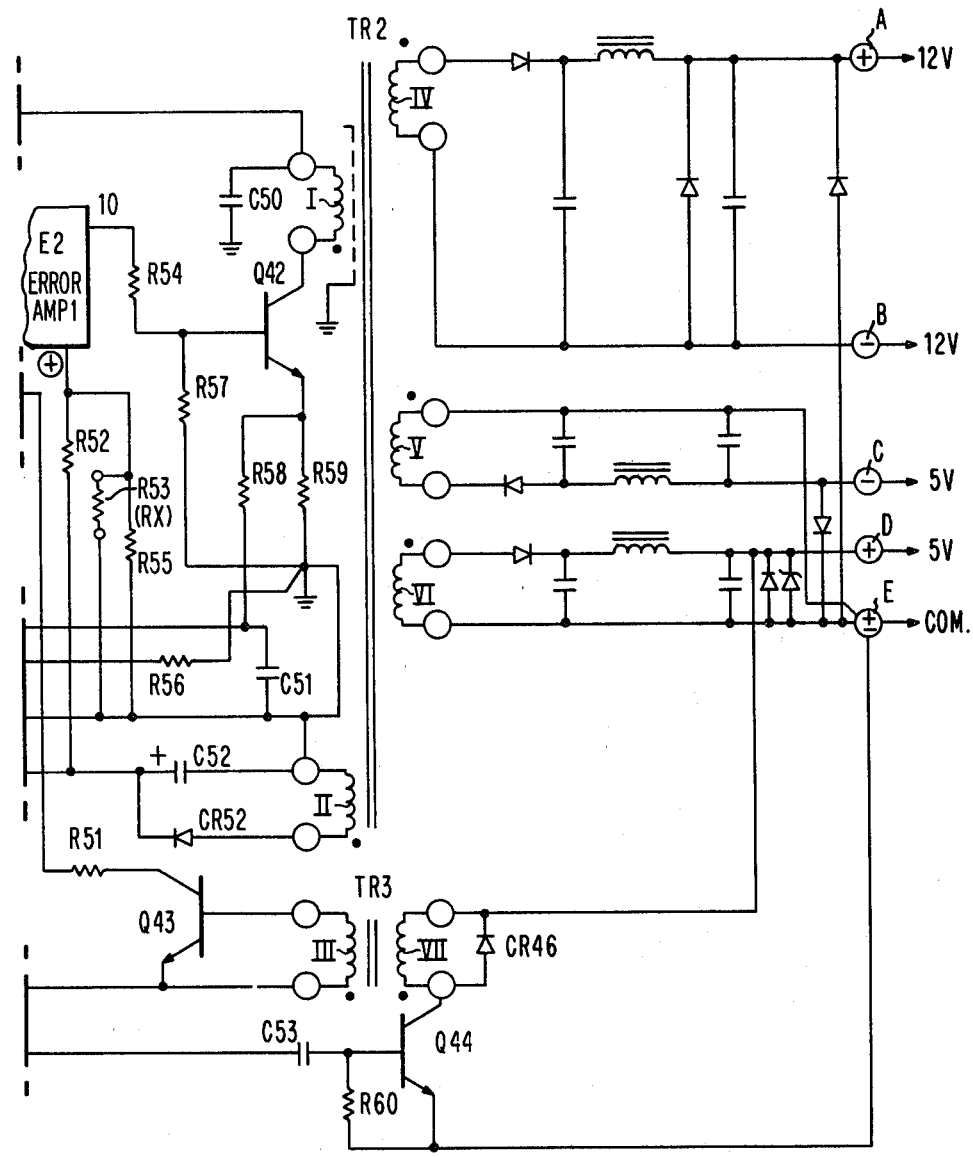

DC/DC Converter (FIG. 12)

As described previously, the DC/DC converter DCC obtains a DC voltage from the primary windings I and II of the transformer TR1. This voltage is phantomed over the transmission lines TL and RL from the originating telephone system. Typically, the received voltage will be approximately 40 volts; however, it is expected to vary over a range of 20–60 volts.

The DC voltage is applied to the DC/DC converter at the input terminals X and Y. The DC to DC converter is isolated from the power supply by a balanced filter comprising the inductance L1 and capacitors C41, C42, C45 and C46. This filter assures a relatively steady voltage at the converter and prevents voltage ripple at the converter from being reflected back to the source. Surges in the input voltage are clipped by a zener diode CR52.

Essentially, the DC/DC converter comprises a monolythic integrated circuit U1 which serves as a source of pulses of constant frequency and variable pulse width. These pulses are applied to the base of a power transistor Q42. The transistor Q42 switches the input voltage applied at the input terminals X and Y across a primary winding I of a transformer TR2, causing interrupted current to flow through this winding. During the period that a pulse is applied to the base of the transistor Q42, the current will increase in the winding I, increasing the magnetic energy stored in the iron of the transformer. When the pulse disappears and the transistor Q42 is switched off, this stored energy is transformed into electrical voltages in the secondary windings II, IV, V and VI.

These voltages are rectified and filtered by the diodes and capacitors shown, and are applied to the output terminals A, B, D, D and E. The magnitudes of the output voltages depend, of course, upon the respective number of turns in the secondary windings.

The integrated circuit U1 is preferably a TL494 circuit of Texas Instruments, Inc., in Dallas, Tex. A second source for this circuit is Motorola Semiconductor Products, Inc., in Phoenix, Ariz. The TL494 is a fixed-frequency, pulse width modulation control circuit. Modulation of the output pulses is accomplished by comparison of a sawtooth waveform created by an internal oscillator on an external timing capacitor $C_T$, to either of two control signals. The output stage is enabled during that portion of time when the sawtooth voltage is greater than the control signals. As the control signals increase, the period of time the sawtooth input is greater, then decreases. Thus, the output pulse width decreases.

The two control signals in the integrated circuit are derived from several sources: a dead time control and two error amplifiers. The dead time control input is compared directly by a dead time control comparator which has a fixed 100 mV offset. With the dead time control input biased to ground, the output is inhibited during the portion of time that the sawtooth waveform is below 100 mV. This provides a pre-set dead time of approximately 3% which is the minimum dead time that can be programmed. The pulse width modulation comparator in the integrated circuit compares the control signal created by the two error amplifiers. The error amplifiers are used to monitor signals such as the output voltage and current of the DC/DC converter and provide gain such that millivolts of error at their inputs will result in control signals of sufficient amplitude to provide 100% modulation control.

The TL494 also has an internal 5 volt stable reference which is fed to an output pin $V_{ref}$. The pin numbering and the associated pin labels are indicated in FIG. 12. Pins 10 and 11 are the emitter and collector, respectively, of the output transistor used in the DC/DC converter according to the invention.

Whereas the general configuration of the DC/DC converter thus far described is known in the art, the circuit shown in FIG. 12 includes several novel features which support the operation of the converter. These relate to voltage regulation, overload protection, compensation for variations in input voltage, a startup circuit, a soft start circuit and an external clock synchronization circuit.

Voltage regulation is accomplished in the DC/DC converter by providing a reference voltage to one error amplifier input and a load-dependent voltage to the other. In particular, a reference voltage is supplied to the negative input of the error amplifier 1 (pin 2) in U1 and the load-dependent voltage is applied to the positive input of this error amplifier 1 (pin 1). The reference voltage applied to pin 2 is obtained by dividing the $V_{ref}$ generated in U1 with a voltage divider comprising resistors R42 and R43. The resistor values are chosen such that approximately 2 volts are applied to pin 2 from the 5 volt $V_{ref}$. The load-dependent voltage applied to pin 1 is derived from a separate, secondary winding II on the transformer TR2. Any voltage drop at the output, due to increase load, produces a corresponding reduction in the voltage drop across the winding II. The output of this winding is rectified by the diode CR42 and filtered by capacitors C43 and C52. As indicated in FIG. 12, one side of the winding II is grounded.

The filtered voltage is applied to pin 1 of the integrated circuit U1 via a voltage divider comprising resistors R52, R53 and R55. A resistor R53 is arranged in parallel with the resistor R55 and is labeled "$R_x$". This resistor is used to calibrate the DC/DC converter at the factory. Its precise value is determined by monitoring the +5 volt output of the converter under normal load conditions (using a voltmeter, for example) and adjusting the resistance value of $R_x$ until this output is an accurate 5 volts.

With the connections described above, the integrated circuit U1 varies the duty cycle of the pulses applied to the transistor Q42 in such a way that the output voltages of the DC/DC converter remain constant. An increase in load results in a reduction in the voltage applied to pin 1 with respect to that applied to pin 2 of the integrated circuit U1, thus extending the duty cycle of the pulses produced at pin 10 so that more energy is supplied to the transformer TR2 to compensate for the increased load.

If the duty cycle of the pulses applied to the transistor Q42 is increased beyond approximately 65%, however there is a danger that the transistor will "latch up"—that is, remain turned on—because the transistor requires a finite time to turn itself off. This turn-off time, which is called the "storage time" of the transistor, depends upon its base-emitter capacitance. The charge stored within the transistor in this "capacitor" must first dissipate to switch the transistor off.

Dead time control is required in the present circuit to prevent this occurrence. This dead time is affected by utilizing the pin 4 in the integrated circuit U1.

As in the case of the voltage regulation, a reference voltage is applied to the negative input of the error amplifier 2 (pin 15) and a pulse width dependent signal is applied to the positive terminal of the error amplifier 2 (pin 16). The reference voltage is obtained by dividing the voltage $V_{ref}$ with a voltage divider comprising resistors R48 and R56. The pulse width dependent signal is derived by filtering the voltage appearing across the emitter resistor R59. This filter comprises the resistor R58 and the capacitors C47 and C51. If this filtered voltage applied to pin 16 of the integrated circuit U1 exceeds the reference voltage on pin 15, then the PWM comparator within the integrated circuit changes state and the output pulse width goes to zero. During the subsequent cycle, of course, the voltage applied to pin 16 will be less than the reference voltage applied to pin 15 so that the maximum pulse will again be produced. As a result, the DC/DC converter will deliver its maximum rated power output in watts, but no more. Additional load placed across the output terminals will result in lowering the voltage produced at the output.

Variations in the voltage received by the DC/DC converter at power input terminals X and Y are compensated by passing this line voltage to pin 16 via a resistor R45. Consequently, the voltage on pin 16 will increase or decrease as the line voltage increases or decreases, respectively, thus varying the tripping point of the overload protection up or down with line voltage.

A start-up circuit is required in the DC/DC converter because the integrated circuit U1 cannot tolerate a supply voltage $V_{cc}$ of more than 42 volts. As noted above, the input power approximately 40 volts, but it is subject to wide swings in voltage. Consequently, the DC/DC converter is designed to generate its own supply voltage for the integrated circuit U1. However, the integrated circuit requires power during an initial start-up period until the converter generates this voltage.

The start-up circuit comprises a resistor R41, a transistor Q41 and a zener diode CR51. Once the converter is operating, the integrated circuit is supplied voltage from the secondary winding II and the rectifier and filter comprising the diode CR42 and the capacitors C43 and C52.

When the power is initially applied to the input terminals X and Y, current flows through the resistor R31 and the zener CR41. The zener diode maintains the base of the transistor Q41 at its breakdown voltage which is 7.5 volts. The transistor Q41 thus conducts and applies voltage to the inputs $V_{cc}$ (pin 12) and C2 (pin 11) of the integrated circuit U1. This input voltage will be maintained at approximately 6.9 volts.

Thereafter, when the DC/DC converter begins to operate, approximately 8 volts is fed back from the circuit comprising the winding II and its rectifier and filter. This 8 volts reverse biases the transistor Q41, turning it off, and supplies the necessary power to the integrated circuit U1. Since the transistor Q41 is merely operated for a brief period during start-up and need not sustain continued use, it may be a relatively low power, inexpensive device.

When the DC/DC converter is initially started up, it will attempt to power equipment which looks like a short circuit. Until the capacitors in the equipment are charged, the load will be large. While the overload protection in the DC/DC converter will activate under this condition, the DC/DC converter according to the invention is provided with an additional circuit, called a "soft start" circuit, so that the duty cycle of the pulses produced by the integrated circuit U1 will initially be small and will then progressively increase to the full value required by the load.

This soft start circuit comprises resistors R47 and R49 and the capacitor C48. During normal operation, the dead time control (pin 4) of the integrated circuit receives a voltage which is divided from the reference voltage $V_{ref}$ by the voltage divider comprising resistors R47 and R49. This dead time control increases the preset "dead time" (100% minus percent duty cycle) from a minimum of 3% to approximately 65%. However, at the time of start up, the capacitor C48 is discharged, shorting the resistor R47, so that pin 4 will see the full voltage produced at the $V_{ref}$ output on pin 14. Consequently, the dead time will be initially larger (approximately 100%) and then will be reduced to the rate dead time (65%) as the capacitor C48 is charged.

Finally, the DC/DC converter is synchronized with an external 64 KHz clock signal applied to the input Z in order to synchronize the output ripple with the operating frequency of the equipment powered by the converter. There are two problems with this external clock synchronization: (1) the integrated circuit U1 does not have an input for operation by an external clock; and (2) in order to generate an external clock signal it is necessary to provide DC power.

Consequently, the DC/DC converter operates solely with the internal clock of the integrated circuit U1 for an initial start-up period and thereafter operates in a mode which is synchronized with the external clock.

The clock synchronization circuit comprises a transformer TR3 having windings III and VII, transistors Q43 and Q44 as well as resistors R51 and R60, capacitor C53 and diode CR64. The clock signal, when it is eventually generated after the equipment driven by the DC/DC converter is powered up, is applied to the base of the transistor Q44. This transistor conducts only when power is applied from the positive 5 volt terminal D and the ground terminal E. Consequently, after start-up, positive and negative pulses are alternately applied to the base of the transistor Q43, thus alternately switching this transistor on and off in synchronism with the external clock. When the transistor Q43 is switched on, the resistor R51 is connected in parallel with the resistor R50.

The frequency and period of the internal clock of the integrated circuit U1 is controlled by the capacitance and resistance connected between ground and the terminal $C_T$ (pin 5) and $R_T$ (pin 6). The pulse period is therefore $R_T C_T$ so that the period may be varied by changing either $R_T$ or $C_T$.

According to the present invention, the time constant $R_T C_T$ is selected (by selecting the values of R50 and C49) so that the natural period of the internal oscillator of the integrated circuit UL is longer than the period of the external clock. Upon receipt of each external clock pulse, the value of $R_T$ is lowered (by connecting the resistor R51 in parallel) so as to shorten the time constant $R_T C_T$. Consequently, on every cycle the internal oscillator sees an initial, relatively large $R_T C_T$ and subsequently, a relatively short $R_T C_T$ with the result that its period corresponds to that of the external clock.

General

As described above the digital telephone apparatus according to the invention is connected for duplex communication with the telephone speech transmission line TL/RL. This apparatus includes the digital transmitter/receiver or transceiver DTR, which is connected with the transmission line TL/RL for transmitting and receiving digital speech data, signalling data and other information via the transmission line TL/RL and also via the internal data bus IB. The serial frame synchronizer SFS detects the synchronization bits and controls the exact timing of the time slots of the data channels in each frame format as well for incoming as for outgoing speed and data transmission.

This configuration of the digital telephone apparatus permits the simple adaption and connection to the normal four wires used in telephone lines. Thus, in a very simple and effective manner it becomes possible to receive and transmit synchronized PCM data, which includes speech data as well as other data and signals.

Because either the primary codec/PCM filter PCF or at least one secondary codec/PCM filter SCF is connected with the internal data bus IB and, via switching means of the voice grade analog circuit VAC, with the microphones, the receiver and the loudspeaker of the subscriber/attendant set, thus utilizing only one channel for PCM voice transmission, at least one more channel is available for the simultaneous transmission of a further data word in the PCM frame format. It is therefore possible to receive and to transmit, completely independently of each other, two different kinds of data. Consequently, the internal data bus IB may be connected with additional peripheral equipment for additional features.

If the internal data bus IB is connected with a peripheral data system, the subscriber who is using the telephone apparatus according to the invention may simultaneously transmit and receive the speech data as well as all types of other data, for example from an external computer.

The transceiver DTR generates pulses in a needed timing scheme with the required broadness, and the serial frame synchronizer places the data bytes in the correct time slots of the frame format. This format contains at least a first plurality of synchronization bits with at least one added signal information bit as a first word and at least a second plurality of speech information bits and/or data information bits as a second word. Each word has one byte of information. In this way the transmission of synchronizing bits, signalling bits, speech and other data bits is PCM compatible and is organized in a simple easily-processed manner.

In small systems, without connected peripheral equipment, a frame may be formed in a very simple, inexpensive manner of two bytes. In larger systems the second byte in a frame represents a speech word whereas the third byte may represent another speech word or a data word. In this way, the telephone apparatus may serve as a telecommunications device for certain peripheral equipment such as a data system connected to the apparatus via a digital interface DDI. Accordingly, the frame format makes it possible to transmit simultaneously different data on separate channels of the same frame.

Line and function keys KL, dial keys KD, an alphanumeric display AD and a subscriber messsage detailed recording printer SMDR are all connectable, directly or indirectly via logic means KLO, with the microcomputer M of the telephone apparatus according to the invention to provide convenient human-interactive input and output. These I/O devices are operated at a much slower speed than the data system mentioned just above.

Furthermore, in the digital telephone apparatus the voice grade analog circuit switching means VAC controlled by the microcomputer M enables an optional transmission of speech data via one of the two codec/PCM filters in one of the corresponding frame words or channels. This arrangement makes it possible not only to transmit data from a data system simultaneously with PCM voice, but also, for example, to establish a call back connection with a remote subscriber or establish an "intercom" connection with a second subscriber independently of the original call. To this end, optional calling and called subscriber signals evaluated by the microcomputer M produce switching commands which control the voice grade analog circuit switching means VAC to interconnect different optional peripheral units with the telephone apparatus. Therefore, the optional use of one and/or both codec/PCM filters, PCF or SCF, makes it possible to use more than one transmission channel in a simple way both separately as well as simultaneously.

The number of frame words fixes the possible number peripheral units which may be simultaneously connected with the digital telephone transmission line. In other words, the number of 8-bit words in a frame determines the number of features which may be added to the telephone apparatus. If three or more words are provided, for example, thereby providing two or more transmission channels, it is possible to simultaneously and independently connect two or more voice grade analog circuits VAC, at least one data system DDI as well as video terminals and/or printers, etc. with the four wire transmission line TL/RL.

There has thus been shown and described a novel digital telephone apparatus which fulfills all the objects and advantages sought therefore. Many changes, modifications, variations and other uses and applications of the subject invention will, however, become apparent to those skilled in the art after considering this specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. Digital telephone apparatus suitable for subscriber stations and attendant consoles and adapted to be connected for communication with a telephone transmission line, said apparatus comprising, in combination:

(a) an internal data bus;

(b) a digital transceiver connected to said internal data bus and adapted to be connected to said telephone transmission line for receiving and transmitting digital speech data, signalling data and other information via said transmission line and also via said internal data bus, said digital transceiver including means for transmitting and receiving signals on said transmission line which correspond to digital data received and transmitted, respectively, on said data bus;

(c) a sync/signalling generator connected to said internal data bus for repeatedly generating and passing to said data bus a first data word containing a binary synchronizing code and a signalling code;

(d) a serial frame synchronizer connected to said internal data bus for repeatedly receiving from said data bus and decoding a first data word containing a synchronizing code and a signalling code;

(e) a microcomputer connected to said sync/signalling generator and to said serial frame synchronizer for repeatedly transmitting binary signalling information to said sync/signalling generator for formation of said first data word to be transmitted, and for repeatedly receiving binary signalling information from said serial frame synchronizer that has been decoded from a received first data word;

(f) input/output means connected to said microcomputer for entering input information into, and indicating output information received from said microcomputer, said microcomputer being operative to translate between said signalling information and said input and output information;

(g) a first codec/PCM filter connected with said internal data bus for converting a second data word appearing on said data bus into an analog voice signal and converting an analog voice signal into a second data word for transmission on said data bus.

2. The telephone apparatus defined in claim 1, further comprising a second codec/PCM filter connected with said internal data bus for converting a third data word appearing on said data bus into an analog voice signal and converting an analog voice signal into a third data word for transmission on said data bus.

3. The telephone apparatus defined in claim 2, further comprising a digital data interface connected with said internal data bus for converting a third data word appearing on said data bus into a digital signal compatible with a peripheral data system, and converting a digital signal received from a peripheral data system into a third data word for transmission on said data bus.

4. The telephone apparatus defined in claim 1, further comprising a voice grade analog circuit, connected to said first codec/PCM filter for, respectively, transmitting an analog voice signal to and receiving an analog voice signal from said first codec/PCM filter.

5. The telephone apparatus defined in claim 2, further comprising a voice grade analog circuit, connected with said first codec/PCM filter and with said second codec/PCM filter for respectively transmitting to said first and second codec/PCM filters an analog voice signal and receiving from said first and second codec/PCM filters an analog voice signal.

6. The telephone apparatus defined in either claim 4 or claim 5, further comprising a telephone handset, connected to said voice grade analog circuit, said handset including transducer means for converting sound into an analog signal and for converting an analog signal into sound, said voice grade analog circuit providing amplification of said analog signals.

7. The telephone apparatus defined in claim 6, further comprising a hands free unit, connected to said voice grade analog circuit, said hands free unit including a microphone for converting sound into an analog signal and a loudspeaker for converting an analog signal into sound.

8. The telephone apparatus defined in claim 7, wherein said hands free unit further includes a circuit, connected to said voice grade analog circuit, for modifying said analog signal to prevent unwanted feedback into said microphone from said loudspeaker.

9. The telephone apparatus defined in claim 1, wherein said telephone transmission line comprises two pairs of wires, one wire pair for transmission of digital speech data away from, and one wire pair for receiving digital speech data at said telephone apparatus, whereby said telephone apparatus operates in the full duplex mode.

10. The telephone apparatus defined in claim 9, further comprising two transformers each having a primary winding, connected to one of said wire pairs, and each having a secondary winding, connected to said digital transceiver, said transformer having inductive coupling for digital speech data transmitted to said transmitting wire pair and inductive coupling for digital speech data received from said receiving wire pair.

11. The telephone apparatus defined in claim 10, further comprising a DC/DC converter, connected to said primary windings of said transformer, said DC/DC converter having means for converting a DC voltage phantomed on said two wire pairs into at least two DC voltages of different value for powering said telephone apparatus.

12. The telephone apparatus defined in claim 1, wherein said internal data bus includes a first bus wire for serial data received by said telephone apparatus, a second bus wire for serial data to be transmitted by said telephone apparatus and a third bus wire for digital clock pulses.

13. The telephone apparatus defined in claim 12, wherein said digital transceiver is connected to all three wires of said internal data bus, wherein said sync/signalling generator is connected to said second and third wires of said internal data bus, wherein said serial frame synchronizer is connected to said first and third wires of said data bus, and wherein said first codec/PCM filter is connected to all three wires of said internal data bus.

14. The telephone apparatus defined in claim 1, wherein said digital data appearing on said data bus is arranged seriatim in successive frames, each frame comprising at least said first data word immediately followed by said second data word.

15. The telephone apparatus defined in claim 14, wherein said frame further comprises a third data word immediately following said second data word.

16. The telephone apparatus defined in any one of claims 1, 14 and 15, wherein said data words are 8 bit words.

17. The telephone apparatus defined in any one of claims 1, 14 and 15, wherein said synchronizing code comprises 7 bits and said signalling code comprises one bit.

18. The telephone apparatus defined in either claim 1 or claim 14, wherein said second word contains a PCM speech sample and one frame is transmitted and received every 125 microseconds.

19. The telephone apparatus defined in claim 15, wherein said second and third words contain PCM speech samples, and wherein said frame is transmitted and received every 125 microseconds.

20. The telephone apparatus defined in claim 1, wherein said digital transceiver transmits and receives simultaneously, thereby operating in the full duplex mode.

21. The telephone apparatus recited in claim 1, wherein said digital transceiver includes means for recovering a clock signal from the signal received on said transmission line.

22. The telephone apparatus defined in claim 1, wherein said digital transceiver includes means for transmitting and receiving signals on said transmission line with alternate mark inverted encoding.

23. The telephone apparatus defined in claim 1, wherein said serial frame synchronizer includes means for generating a first enable signal when said first data word appears on said data bus and generating a second enable signal when said second data word appears on said data bus, said first enable signal being passed to said sync/signalling generator and said second enable signal being passed to said first codec/PCM filter.

24. The telephone apparatus defined in claim 2, wherein said serial frame synchronizer includes means for generating a first enable signal when said first data word appears on said data bus, a second enable signal when said second data word appears on said data bus and a third enable signal when said third data word appears on said data bus, said first enable signal being passed to said sync/signalling generator, said second enable signal being passed to said first codec/PCM filter and said third enable signal being passed to said second codec/PCM filter.

25. The telephone apparatus defined in claim 23 or 24, wherein said sync/signalling generator is responsive to said first enable signal and to a clock signal appearing on said internal data bus to serially pass said first data word onto said data bus.

26. The telephone apparatus defined in claim 1, wherein said input/output means include a telephone hook switch operable by the user of said telephone apparatus for placing said apparatus in the "on-hook" or "off-hook" condition.

27. The telephone apparatus defined in claim 1, wherein said microcomputer converts signalling information received from said serial frame synchronizer into output information and converting input information into signalling information.

28. The telephone apparatus defined in claim 1, wherein said microcomputer includes means for formatting a sequence of bits comprising, in succession, start, signalling and stop bits, said microcomputer transmitting said bits to said sync/signalling generator for inclusion in successive ones of said first data word, thereby defining a superframe for transmission on said transmission line.

29. The telephone apparatus defined in claim 28, wherein said microcomputer receives, in succession, start, signalling and stop bits from said serial frame synchronizer and synchronizes itself to said succession of bits so as to identify those bits representing a signalling word.

30. The telephone apparatus defined in claim 3, wherein both said second codec/PCM filter and said digital data interface are operative to transmit to and receive from said internal data bus a third data word, and wherein said microcomputer includes means for selecting either said second codec/PCM filter or said digital data interface for operation.

31. The telephone apparatus defined in claim 5, wherein said microcomputer is connected to said voice grade analog circuit, said microcomputer being operative to configure said voice grade analog circuit for operation with one of said first and second codec/PCM filters.

32. The telephone apparatus defined in claim 1, wherein said input/output means include dial keys for selecting telephone numbers.

33. The telephone apparatus defined in claim 1, wherein said input/output means include line keys for selecting one of a plurality of telephone lines.

34. The telephone apparatus defined in claim 1, wherein said input/output means include function keys for selecting one of a plurality of telephone functions.

35. The telephone apparatus defined in claim 1, wherein said input/output means include a display for indicating alphanumeric characters.

36. The telephone apparatus defined in claim 1, wherein said input/output means include a printer for printing alphanumeric characters.

37. The telephone apparatus defined in claim 21, wherein identical signalling information is repeatedly transmitted to said microcomputer, and wherein said microcomputer compares successively received signalling information to determine the existence of bit errors.

38. The telephone apparatus defined in claim 37, wherein said identical signalling information is transmitted three times in succession, and wherein said microcomputer determines the correct signalling information by majority vote.

39. The telephone apparatus defined in claim 1, further comprising a digital data interface connected with said internal data bus for converting a third data word appearing on said data bus into a digital signal compatible with a peripheral data system, and converting a digital signal received from a peripheral data system into a third data word for transmission on said data bus.

* * * * *

UNITED STATES PATENT AND TRADEMARK OFFICE
CERTIFICATE OF CORRECTION

PATENT NO. : 4,389,544
DATED : June 21, 1983
INVENTOR(S) : Wagner et al.

It is certified that error appears in the above—identified patent and that said Letters Patent is hereby corrected as shown below:

In column 3, line 30 change "receiver to -- receive --.

In column 4, line 60 change "frame" to -- frames --.

In column 16, line 41 add -- one-half the bit time wide -- after "approximately".

In column 24, line 54 change "increase" to -- increased --.

Signed and Sealed this

Sixteenth Day of August 1983

[SEAL]

Attest:

GERALD J. MOSSINGHOFF

Attesting Officer    Commissioner of Patents and Trademarks